US 6,880,084 B1

(12) United States Patent
Brittenham et al.

(10) Patent No.: US 6,880,084 B1
(45) Date of Patent: Apr. 12, 2005

(54) METHODS, SYSTEMS AND COMPUTER PROGRAM PRODUCTS FOR SMART CARD PRODUCT MANAGEMENT

(75) Inventors: Peter J. Brittenham, Apex, NC (US); Larry W. Henson, Apex, NC (US); Stephen R. Kleinert, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 09/671,833

(22) Filed: Sep. 27, 2000

(51) Int. Cl.[7] ............................................. H04L 9/00
(52) U.S. Cl. ..................... 713/173; 713/200; 705/66
(58) Field of Search ..................... 713/159, 172–174, 713/185, 200; 705/41, 64–69, 257; 235/375, 379–380; 257/679; 902/26; 717/107–108, 116; 719/315–316

(56) References Cited

U.S. PATENT DOCUMENTS

| | | | | |
|---|---|---|---|---|
| 5,684,742 A | * | 11/1997 | Bublitz et al. | 365/189.01 |
| 6,202,155 B1 | * | 3/2001 | Tushie et al. | 713/200 |
| 6,401,203 B1 | * | 6/2002 | Eigeles | 713/156 |
| 6,402,028 B1 | * | 6/2002 | Graham et al. | 235/380 |
| 6,735,593 B1 | * | 5/2004 | Williams | 707/102 |

OTHER PUBLICATIONS

Agarwal, R. et al., An Operational Approach to the Design of Workflow Systems, May 2000.*

* cited by examiner

Primary Examiner—Thomas R. Peeso
Assistant Examiner—Minh Dinh
(74) Attorney, Agent, or Firm—Myers Bigel Sibley & Sajovec; Jerry W. Herndon

(57) ABSTRACT

Methods, systems and computer program products are provided for managing a smart card product by providing a plurality of generic definitions, at least a portion of which have a predefined relationship to others of the generic definitions, so as to provide a hierarchy of generic definitions. Generic definitions are selected from the plurality of generic definitions and associated with an instance of a card product definition so as to define characteristics of the smart card product associated with the instance of the card product definition. The selected generic definitions are populated with data associated with the smart card product so as to provide a hierarchy of instances of the generic definitions which define the characteristics of the smart card product. The smart card product is managed utilizing the hierarchy of instances of the generic definitions so as to provide the smart card product having the defined characteristics. Systems for managing smart card products utilizing instances of definitions from the hierarchy of definitions are also provided.

45 Claims, 28 Drawing Sheets

METHODS, SYSTEMS AND COMPUTER PROGRAM PRODUCTS FOR SMART CARD PRODUCT MANAGEMENT

FIELD OF THE INVENTION

The present invention relates to smart card products and more particularly to the management of smart card products.

BACKGROUND OF THE INVENTION

Cards, such as credit cards, with built-in processing capabilities are generally referred to as smart cards. Smart cards may have many differing uses. For example, it has been proposed that smart cards be used for a wide array of uses ranging from access to networks through a network computer to on-line banking through the storage of encrypted banking information on the card. Such uses have, generally not been widespread, however, possibly as a result of the expense of manufacturing and maintaining smart cards. However, as costs are reduced, it is expected that smart card usage will increase.

A smart card product is comprised of many interrelated components, both physical and logical. Physical components include the plastic card, the embedded chip, ink, logos, or holograms applied to the plastic, and optional magnetic stripe and bar codes. Logical components are made up of software programs and data, including the card operating system, applications and application data, and security mechanisms such as keys and certificates. As used herein, the term "smart card" is used to refer to a card having processing capabilities and the term "smart card product" is used to refer to a smart card configured with the logical and physical components for a particular use of the smart card.

To produce a smart card product, each of the interrelated logical and physical components should be taken into account in the production and distribution process. However, various aspects of the smart card product may be controlled by different business enterprises. For example, the business enterprise which manufactures the smart card may differ from the business enterprise which controls the applications or data to be loaded on the smart card product. Furthermore, each of these enterprises may differ further from the enterprises responsible for card issuance or card security. Furthermore, for smart card products which may be field programmed, the application or applications loaded on the smart card may be changed, update, deleted or otherwise modified after the card has issued. Such modifications may be performed by a further business enterprise. As can be seen from this brief example, the manufacture, issuance and maintenance of smart card products may be a complex task. Such tasks may involve different enterprises which may coordinate their efforts to provide a smart card product.

SUMMARY OF THE INVENTION

Embodiments of the present invention include methods, systems and computer program products which provide for managing a smart card product by providing a plurality of generic definitions, at least a portion of which have a predefined relationship to others of the generic definitions, so as to provide a hierarchy of generic definitions. Generic definitions are selected from the plurality of generic definitions and associated with an instance of a card product definition so as to define characteristics of the smart card product associated with the instance of the card product definition. The selected generic definitions are populated with data associated with the smart card product so as to provide instances of the generic definitions which define the characteristics of the smart card product.

The smart card product may be managed utilizing the hierarchy of instances of the generic definitions so as to provide the smart card product having the defined characteristics. In particular, one or more of registration of card product holders, smart card product enablement, smart card product personalization, smart card product application data, smart card product hot lists and smart card product post-issuance application updates may be managed utilizing the hierarchy of instances of the generic definitions so as to provide the smart card product having the defined characteristics.

In further embodiments of the present invention, the selected generic definitions may be selectively linked to each other to further define the hierarchy of generic definitions associated with the instance of the smart card product so as to further define the smart card product. In such embodiments, the selection and linking of the selected definitions to the smart card product definition may be provided by establishing an instance of the card product definition and associating one or more chip definitions with the instance of the card product definition. One or more process definitions is also associated with the instance of the card product definition. Furthermore, one or more task definitions, one or more enterprise definitions and one or more application definitions are also associated with the instance of the card product definition.

In such embodiments, the association of process definitions with the instance of the card product definition may be provided by associating an enablement process definition, a registration process definition and a personalization process definition with the card product definition. Furthermore, one or more task definitions may be associated with the enablement process definition so as to carry out the enablement process. One or more task definitions may be associated with the registration process definition so as to carry out the registration process. One or more task definitions may also be associated with the personalization process definition so as to carry out the personalization process.

In further embodiments, associating process definitions with the instance of the card product definition may be provided by associating a hot list definition with the instance of the card product definition. In such embodiments, one or more task definitions may be associated with the hot list process definition so as to carry out the hot list process.

In additional embodiments of the present invention, associating process definitions with the instance of the card product definition may be accomplished by associating an application load definition with the instance of the card product definition. Furthermore, one or more task definitions may be associated with the application load process definition so as to carry out the application process.

In still other embodiments of the present invention, an enterprise definition is associated with the a process definition if the process definition utilizes resources of an enterprise outside the domain of a smart card management server. Furthermore, a connection definition is associated with the process definition so as to define a mechanism for establishing a connection between the smart card management server and an enterprise associated with the enterprise definition associated with the process definition.

In still further embodiments of the present invention, the plurality of generic definitions include process definitions which define smart card management tasks so as to manage the attributes of the smart card product.

In additional embodiments, the plurality of generic definitions include one or more of a chip definition, a platform definition, a card product holder definition, a device definition, a certificate definition, a key definition, an application definition and a process definition.

While the invention has been described above primarily with respect to the method aspects of the invention, both systems and/or computer program products are also provided.

DETAILED DESCRIPTION OF PREFERRED EMBODIMENTS

Figure 1:
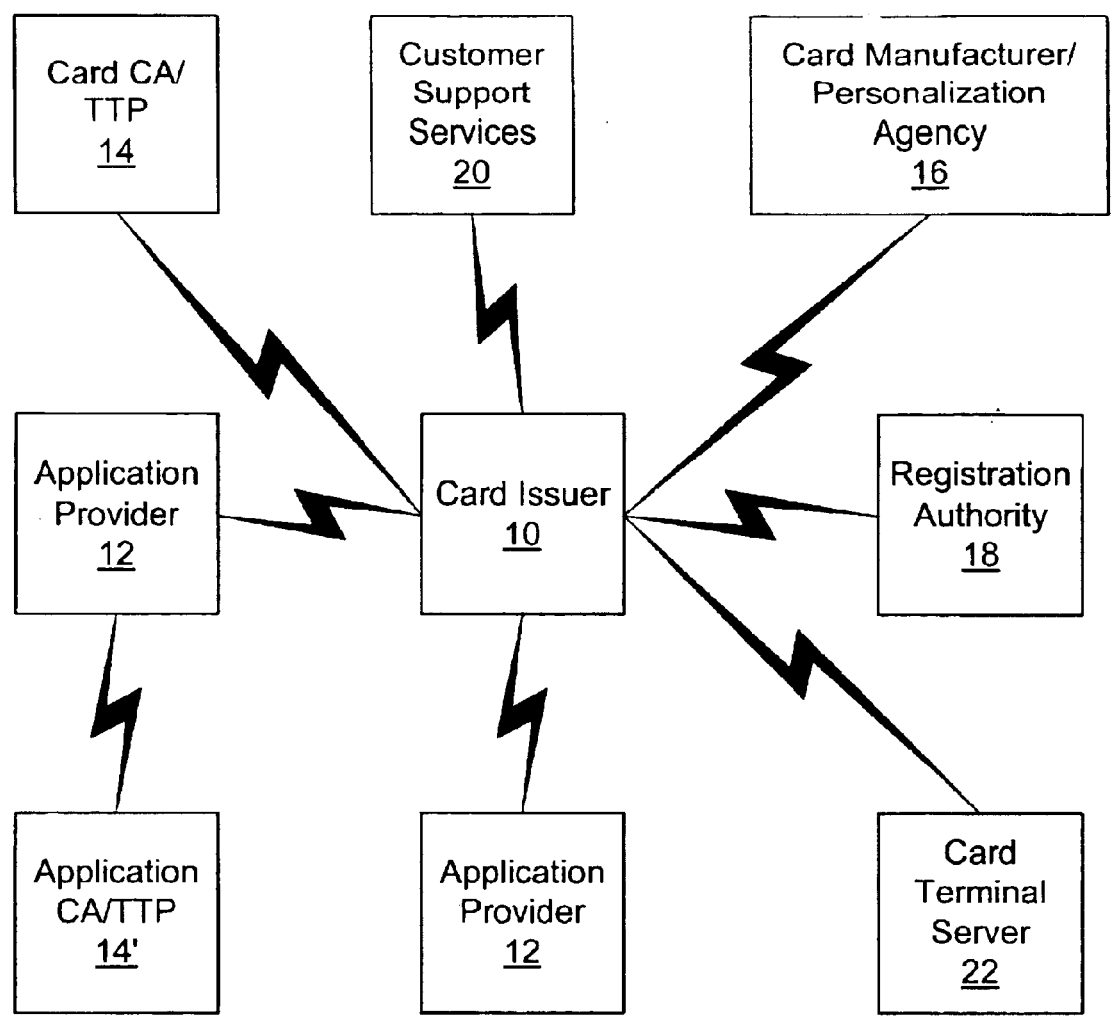
FIG. 1 is a block diagram of a smart card product system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one skilled in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Smart card product management systems according to embodiments of the present invention may provide the functions and processes necessary to support the life cycle of smart card products or portions of the life cycle of a smart card product. The smart card product management system may manage the smart card product from its initial creation and distribution to an end user, to the time when the smart card product is expired, withdrawn, or replaced by the card issuer or portions thereof. During a smart card product's useful life, the smart card product management system may support the capability to dynamically update the smart card product's content, adding and deleting applications, replacing keys and certificates, or, in the event of a lost or stolen card, preventing its unauthorized usage.

As described in more detail below, in embodiments of the present invention, the smart card product management system captures the characteristics of each component of a smart card product in a component "definition." Each component is represented by a definition, which encapsulates the component's characteristics, interrelationships with other components, and unique work processes in a single program object. The use of component definitions to provide the "blueprint" for each different smart card product provides a mechanism for expressing the hierarchical relationship of the smart card product's components, and for simplifying the selection and performance of management functions against individual smart card products. Once created and activated, a set of definitions for a smart card product can be used repeatedly to manage the potentially millions of individual cards issued of that product type. Furthermore, the hierarchical relationship of the definitions is well suited for implementation using a relational data repository, thus availing the card issuer to the security, transactional integrity, and archival capabilities of the variety of relational database products available in the marketplace.

An example of a smart card product environment in which embodiments of the present invention may be utilized is illustrated in FIG. 1. In this environment, the Card Issuer 10 is the central point of control. The Card Issuer 10 establishes business relationships with other enterprises in order to support the issuance and usage of its card products. Although all of the enterprises in FIG. 1 are shown as separate entities, some of them may actually be part of the same enterprise. For example, the Customer Support Services will typically be a part of the Card Issuer's enterprise, and a Card Issuer 10 can be an Application Provider 12 if they are deploying their own applications.

As illustrated in the example of FIG. 1, the Card Issuer 10 (CI) establishes the policies that control the smart card product management system, and therefore have a significant influence over the overall card management scheme. The Card Issuer 10 may also own the card and be legally responsible for it. The Application Provider(s) 12 (AP) may develop and own one or more applications, and may be legally and technically responsible for them. The Application Provider 12 establishes business relationships with one or more Card Issuers 10, which will put the Application Provider's application on their cards.

A Certificate Authority (CA) generates, manages, and administers public key certificates for both cards and applications. The CA is typically an external service provider for the Card Issuer 10 or Application Provider 12. The Card Issuer 10 and the Application Provider 12 may be responsible for issuing certificates. One or more CAs may operate within a smart card product management system. A Trusted Third Party (TTP) provides cryptographic services for the Card Issuer 10, the Application Provider 12, and the Personalization Agency 16. The TTP is typically responsible for the secure generation and storage of cryptographic keys. As illustrated in FIG. 1, the CA and TTP may be the same enterprise. Furthermore, the CA and TTP may be associated with a Card Issuer 10 or an Application Provider 12. Thus, in FIG. 1, a Card CA/TTP 14 is illustrated as communicating with the Card Issuer 10 and an Application CA/TTP 14' is illustrated as communicating with the Application Provider 12.

A Card Manufacturer, which may also be referred to as an Initialization Agency, performs the initialization of smart card chips during module production. The information that is needed to initialize the chip is provided by the card and application issuing functions within the smart card product management system. The Card Manufacturer may also act as a Personalization Agency (PA). The PA 16, which may also be referred to as a Card Bureau, personalizes both the chip and the plastic on a card. In some systems, the Personalization Agency 16 may interface directly with the TTPs or the CAs on behalf of both the Card Issuers 10 and the Application Providers 12. The Personalization Agency 16 may also provide related services, such as production and mailing of card letters.

The Registration Authority 18 (RA) may operate the registration process for card product holders that have been defined by the Card Issuers 10, the Application Providers 12, and the Certificate Authorities. The RA 18 may be a part of the Card Issuer 10, the Application Provider 12 or the Certificate Authority 14, or it may be a separate organization. In any case, it may be considered a logical extension of these enterprises and, therefore, may operate a portion of the smart card product management system.

A customer support services center 20, which is also referred to as a call center or service center, may be the Card Issuer 10 and the Application Provider 12 point of contact for a card product holder. A Card Terminal Server 22 may provide access points for use, update, distribution and/or activation of the smart card product.

In addition to the enterprises described above and illustrated in FIG. 1, other enterprises may also play a role in the development, production and deployment of a smart card product. For example, Card Operating System (OS) providers may contribute the information, such as product specifications, that are required to implement card capabilities management for a specific card or set of cards. Card distributors may be responsible for the distribution of newly issued smart card products to an outlet(s) that will subsequently sell or distribute the cards to an end user. Examples of such distribution may include anonymous cards stocked and sold from vending machines, distributed to retail outlets, or delivered to organizations that may distribute the cards as part of a promotional program.

As is clear from the exemplary environment of FIG. 1, the complex nature of the smart card product environment may make the use of a smart card product management system beneficial. Smart card product management includes providing the management support for multi-application, card-based products within a multi-enterprise environment. A smart card product may be the business product that a Card Issuer 10 plans to market. For example, the business product could be a corporate campus card, loyalty card, or corporate traveler card. The functions provided by a smart card product management system may include issuance, life-cycle management, post-issuance support, security services, and information exchange for the objects that are managed by a smart card product management system. Cards, applications, keys, certificates, enterprises and card product holders are examples of these objects. The smart card product management system provides the basis for developing smart card product management solutions using a component-based design. As is described in more detail herein, embodiments of the smart card product management system according to the present invention may provide a set of core card management components. These components may be assembled and/or extended (or built upon) to produce a customer specific implementation of a complete smart card product management system.

Embodiments of the smart card product management system of the present invention may provide the facilities to manage each smart card product through its life-cycle, from initial creation and issuance, to activation and intended usage, and ending when the card is replaced or withdrawn. In addition to the card itself, applications, application data, certificates, and keys which reside on the card may also be managed by the smart card product management system. In particular embodiments of the present invention, the smart card product management system may provide support for a multi-application card that has the capability to contain more than one executable application or more than one set of application data (single application smart card products may also be supported). Embodiments of smart card product management system, according to the present invention may also support existing multi-application card operating systems, as well as future operating systems. For example, embodiments of the present invention may support Java Card (with Open Platform support), multi-application operating system for smart cards (MULTOS) or Smart Card for Windows.

Furthermore, embodiments of the present invention may provide support for multiple card issuers and/or application providers, as well as the enterprises with which card issuers and/or application provides interact (e.g. registration authorities and certificate authorities).

Figure 2:
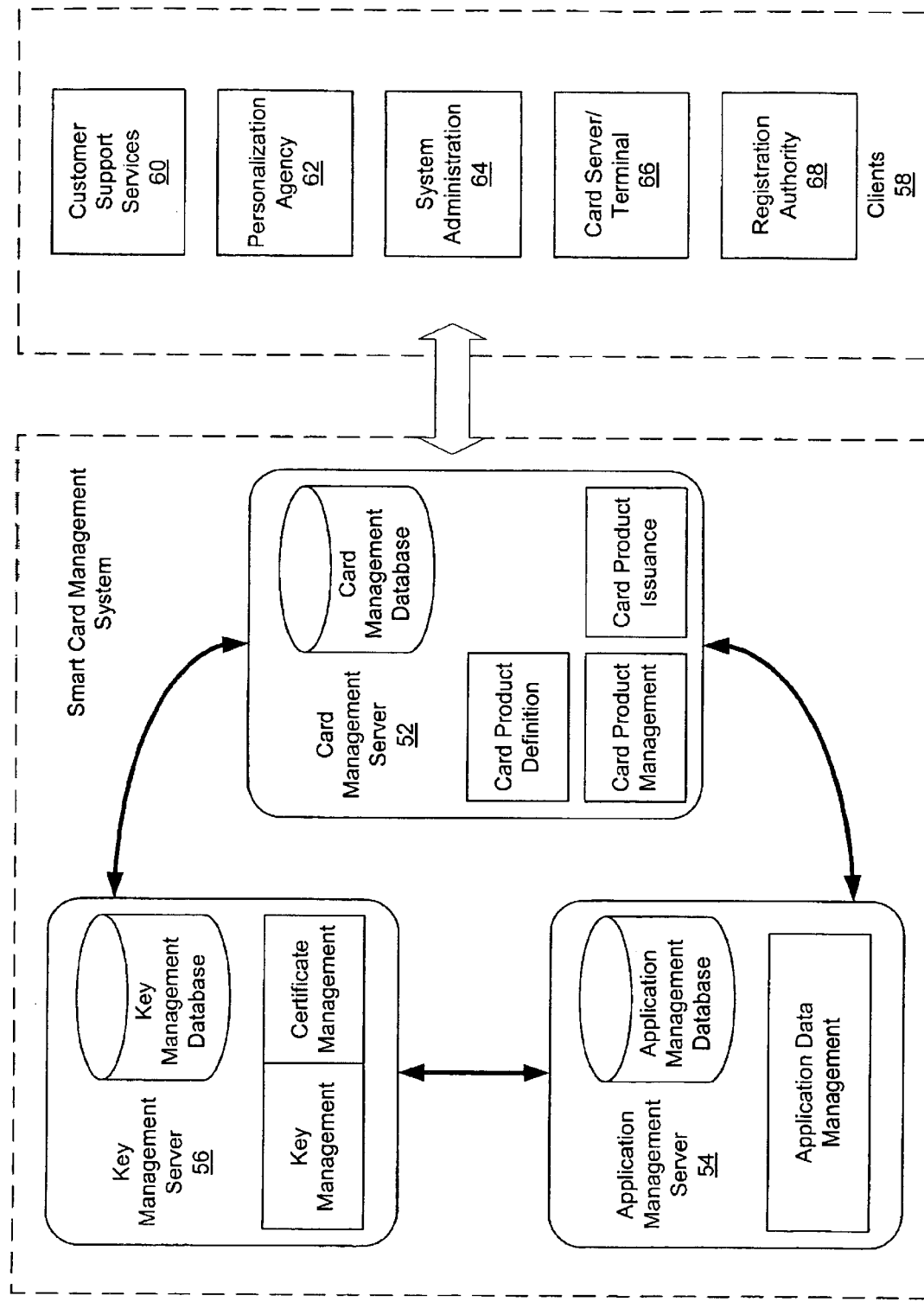
FIG. 2 is a block diagram of smart card product management system according to embodiments of the present invention.

An example of a smart card product management system according to embodiments of the present invention is illustrated in FIG. 2. As seen in FIG. 2, a smart card product management system may include a card management server 52, an application management server 54, and a key and certificate management server 56. The smart card product management server 52 may be controlled by the Card Issuer 10 and may control the operation of the other management systems. The Card Issuer 10 has the primary responsibility for card product definition, card product issuance and card product management. The application management server 54 may be controlled by the Application Provider 12 which has the primary responsibility for the application data management functions, which are utilized in the card product issuance process. The application management server 54 provides the platform for implementing the application data management functions. These servers provide access to application personalization data and assist with key management for applications. Finally, the key and certificate management server 56 may be operated by enterprises external to the Card Issuer 10 or Application Provider 12. These servers provide the functions utilized to generate and store both keys and certificates. The key and certificate management server 56 is usually operated by a Trusted Third Party for key management and a Certificate Authority for certificate management.

As is further illustrated in FIG. 2, the smart card product management system may interface with various clients 58. For example, a customer support services client 60 may be utilized by the customer support service enterprise 20, a personalization agency client 62 may be utilized by a personalization agency 16 to perform the card personalization service and a system administration client 64 may provide access to the smart card product management system to carry out administrative functions. Additionally, a card server/terminal client 66 may provide terminal functions and a registration authority client 68 may be provided to perform registration operations.

Embodiments of the smart card product management system may utilize a standard method for communication both between management systems 52, 54 and 56 and from clients 58 to the management systems. These communication methods may, for example, encapsulate a transaction request and response using a standard message format, such as a message format based on the Extensible Markup Language (XML). Thus, transactions that occur between external enterprises may have a well defined XML data format.

Figure 3:
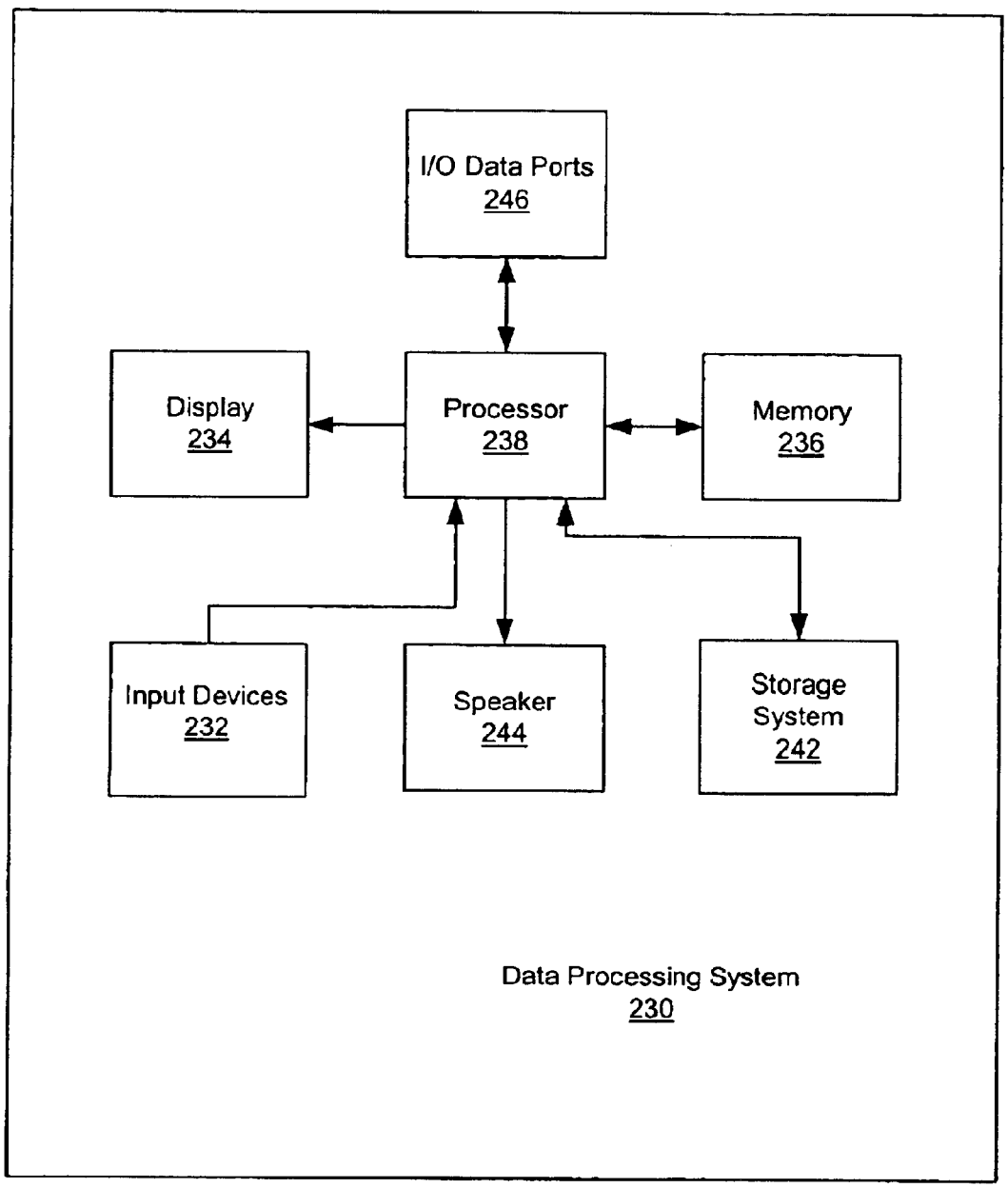
FIG. 3 is a block diagram of a data processing system suitable for use as various components of a smart card product management system according to embodiments of the present invention.

Referring now to FIG. 3, an exemplary embodiment of a data processing system 230 suitable for use as a server or a client in accordance with embodiments of the present invention is illustrated and may include input device(s) 232 such as a keyboard or keypad, a display 234, and a memory 236 that communicate with a processor 238. The data processing system 230 may further include a storage system 242, a speaker 244 and an I/O data port(s) 246 that also communicate with the processor 238. The storage system 242 may include removable and/or fixed media such as floppy disks, ZIP drives, hard disks or the like as well as virtual storage such as a RAMDISK. The I/O data port 246 can be used to transfer information between the data processing system 230 and another computer system or a network (e.g., the Internet). Such data processing systems may include, for example, personal computers, laptop computers, mainframe computers, pervasive computing devices such as personal digital assistants, smartphones or the like, or even embedded processing systems. The components of a particular data processing system may be conventional or custom components, such as those used in many conventional computing devices, which may be configured to operate as described herein.

Figure 4:
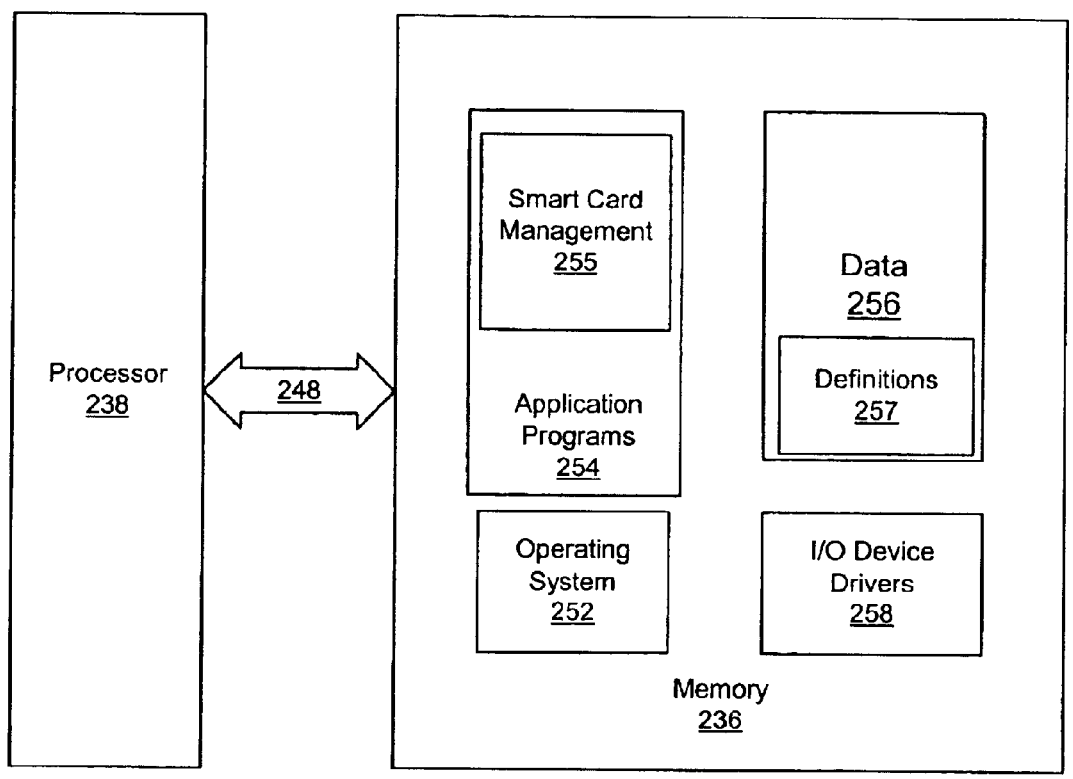
FIG. 4 is a more detailed block diagram of data processing systems according to embodiments of the present invention.

FIG. 4 is a block diagram of data processing systems that illustrates systems, methods, and computer program products in accordance with embodiments of the present invention. The processor 238 communicates with the memory 236 via an address/data bus 248. The processor 238 can be a commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 4, the memory 236 may contain several categories of software and data used in the data processing system 230: the operating system 252; the application program(s) 10; the input/output (I/O) device drivers 258; and the data 256. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 by the application programs 254 to communicate with devices such as the input devices 232, the display 234, the speaker 244, the storage system 242, the I/O data port(s) 246, and certain memory 236 components. The application program(s) 254 is illustrative of the programs that implement the various features of the data processing system 230. Finally, the data 256 represents the static and dynamic data used by the application program(s) 254, operating system 252, I/O device drivers 258, and other software programs that may reside in the memory 236.

As is further seen in FIG. 4, application program(s) 254 may include smart card product management system application(s) 255 which may carry out some or all of the functions described herein. Furthermore, the data 256 may include smart card product definition objects 257 which, as described herein, may be utilized in a hierarchical manner to define smart card products which may be produced utilizing embodiments of the present invention. The operation of the smart card product management system application 255 and the smart card product definition objects 257 is described in detail below.

Figure 5:
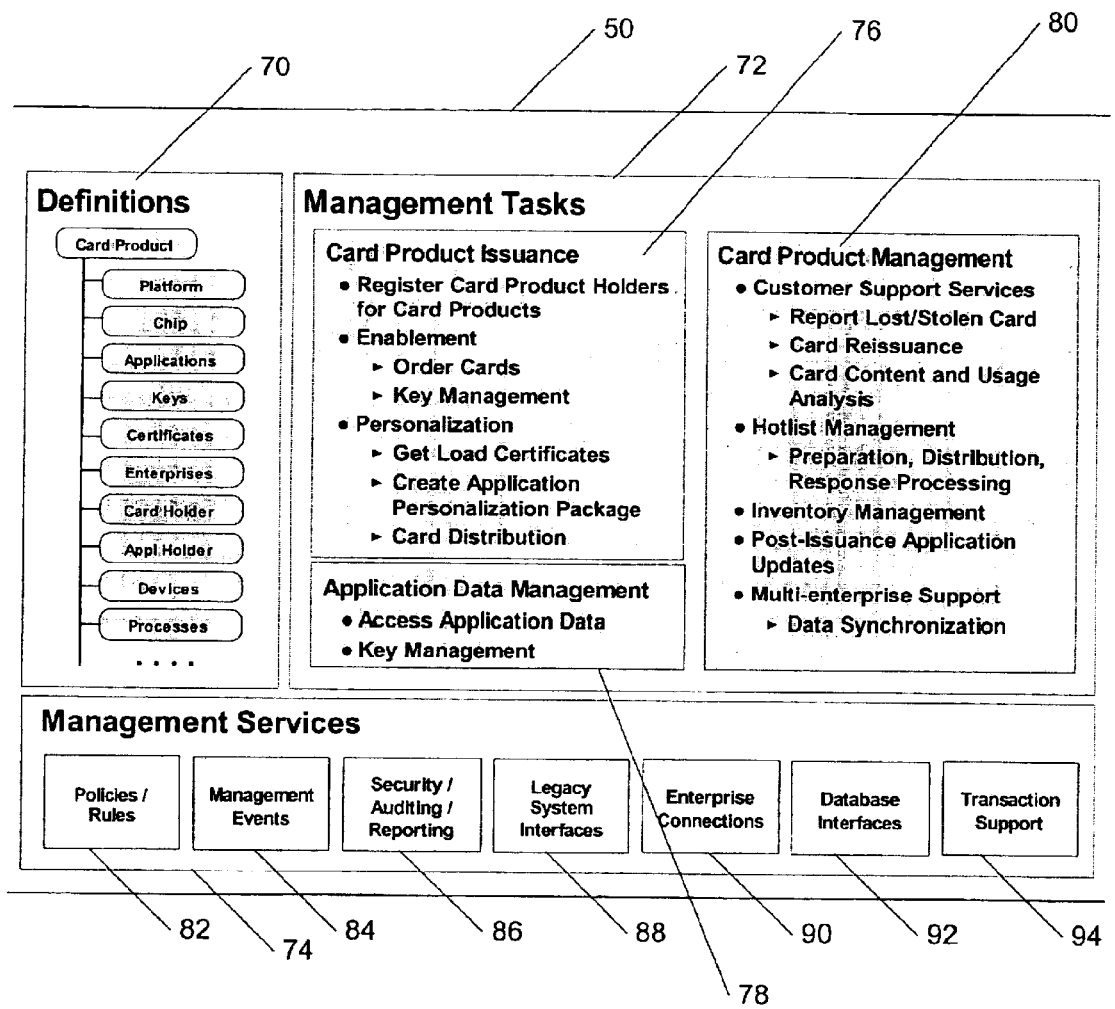
FIG. 5 is a block diagram of a components of a smart card product management system according to embodiments of the present invention.

Embodiments of the present invention may provide a smart card product management system which may be defined based on the business rules and relationships established by the Card Issuer 10. As illustrated in FIG. 5, the smart card product management system 50 may provide management of smart card product deployment in utilizing one or more of three components of the smart card product management system: a definitions component 70; a management tasks component 72; and a management services component 74. The definitions component 70 contains the basic attributes for the card products that are managed by the smart card product management system 50. As seen in FIG. 5, these, definitions may include platform definitions, chip definitions, application definitions, key definitions, certificate definitions, enterprise definitions, card holder definitions, application holder definitions, device definitions, process definitions and the like. These definitions are utilized by the smart card product management system to specify and control a smart card product.

The management tasks component 72 defines the basic functions that are performed by the smart card product management system 50. Embodiments of the present invention may, in addition to other management tasks, provide one or more of three management tasks: card product issuance 76, application data management 78, and card product management 80. The card product issuance 76 function may provide for initial card issuance and reissuance while the application data management 78 and the card product management 80 functions may provide for post-issuance and multi-enterprise management support.

The management services component 74 may provide the foundation services that may be utilized by both the definitions component 70 and the management tasks component 72. Such services may include, for example, policies and rules management 82, management events 84, security, auditing and reporting 86, legacy system interfaces 88, enterprise connections 90, database interfaces 92 and transaction support 94.

As described above, smart card product management systems according to embodiments of the present invention may include a set of management systems that communicate with one another. Generally, these management systems include a data repository that contains the entities that they manage. Thus, as illustrated in FIG. 6, the smart card product management system 50 includes a data repository 94 which may be accessed by the card management server 52.

Figure 6:
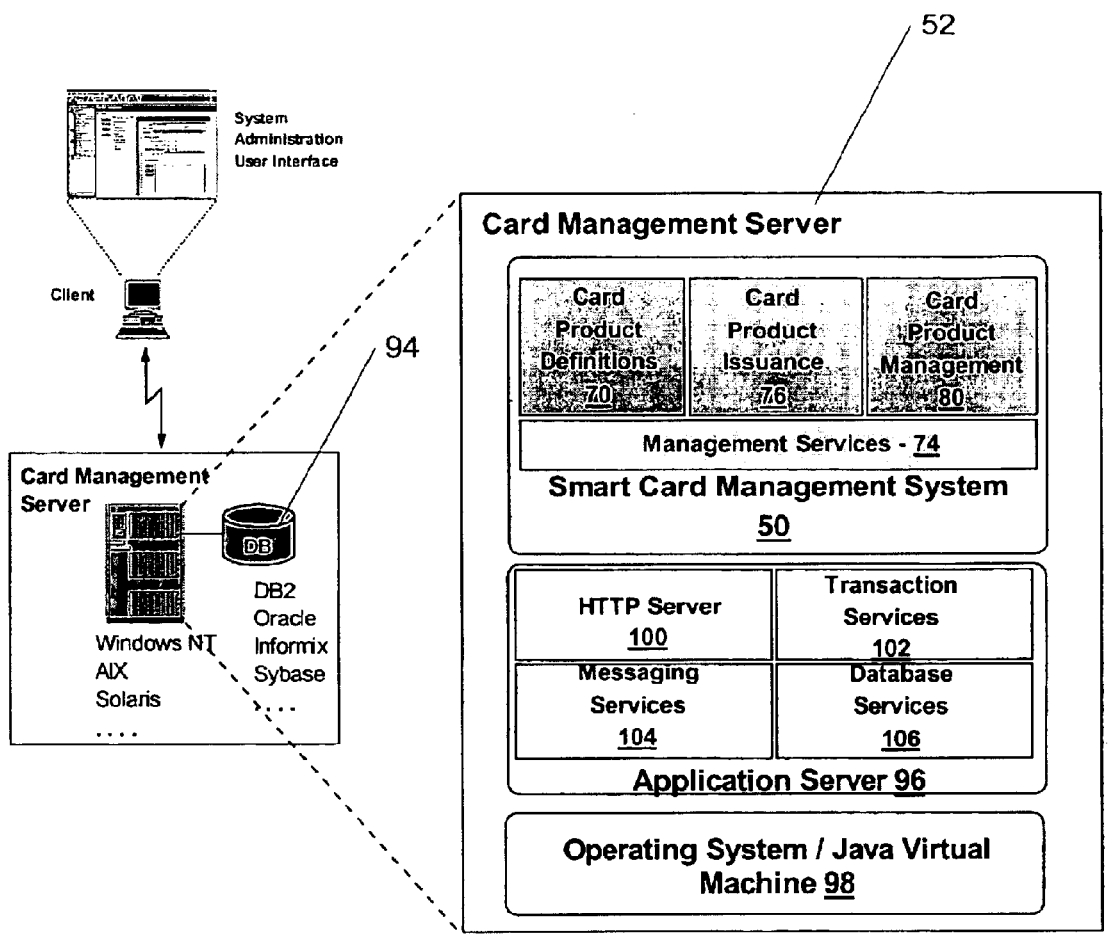
FIG. 6 is a block diagram of a card management server according to embodiments of the present invention.

As illustrated in FIG. 6, the smart card product management server 52 may incorporated several components including the smart card product management system 50, an application server 96 and an operating system 98. The components of the smart card product management system 50 may be implemented so that they run in conjunction with an application server 96. Application servers may provide a scalable runtime environment for business applications, integration with other enterprise systems, and an environment for rapid application development. The application server 96 provides a platform that contains the runtime environment for an application's business logic. In particular embodiments, applications run as servlets and/or Enterprise JavaBeans (EJB), and communicate with clients and other applications, or application components, using HTTP and IIOP (Internet InterOrb Protocol). Servlets are protocol and platform-independent server side components which are typically written in Java. Since servlets are written in Java, they are typically more flexible and stable than CGI scripts and provide an interface that can be used on different platforms without additional porting. Enterprise JavaBeans are JavaBeans that deliver reusable, reliable, business application middleware. Enterprise JavaBeans provide a component model for server applications which allows an application to be easily partitioned into user interface and business logic. The user interface or client side of the application can be written in Java, HTML, C/C++, or Visual Basic or other suitable programming languages. Because the server side business logic is packaged as Enterprise JavaBeans, it can be deployed anywhere in the network, reused with other business applications running on different platforms, and managed from a remote console.

As is further illustrated in FIG. 6, the application server 96 may contain a set of foundation services. An application can utilize the functions provided by the foundation services, such as database and transaction support, as well as the directory and security services provided by the network infrastructure. The foundation services provide the core functionality to support the applications that are running on an application server. These services may include an HTTP server 100, database services 106, transaction services 102, and messaging services 104.

The HTTP server 100 provides basic web-based services. This may include coordinating, collecting, and assembling Web pages composed from static and dynamic content which is then delivered directly to clients. The HTTP server 100 can also provide access to applications that are implemented as servlets. The transaction services 102 may extend the functionality of the application server 96 to provide scalable and secure transaction application execution environment. The database services 106 may provide a standard interface to relational databases. For example, the database services 106 may provide an interface to DB2, Oracle, Sybase, Informix or other relational databases. The messaging services 104 may provide access to Message Oriented Middleware (MOM). These types of services may be used for messaging between applications, which can be running on clients or servers.

In addition to the smart card product management system 50 and the application server 96, the card management server 52 also includes an operating system 98. Both the smart card product management system 50 and the application server 96 may be run on top of an operating system 98 which may, in Java embodiments of the present invention, provide the services of a Java Virtual Machine (JVM). Suitable operating systems may include, for example, Windows NT, AIX, Solaris, Linux and OS/390.

Figure 7:
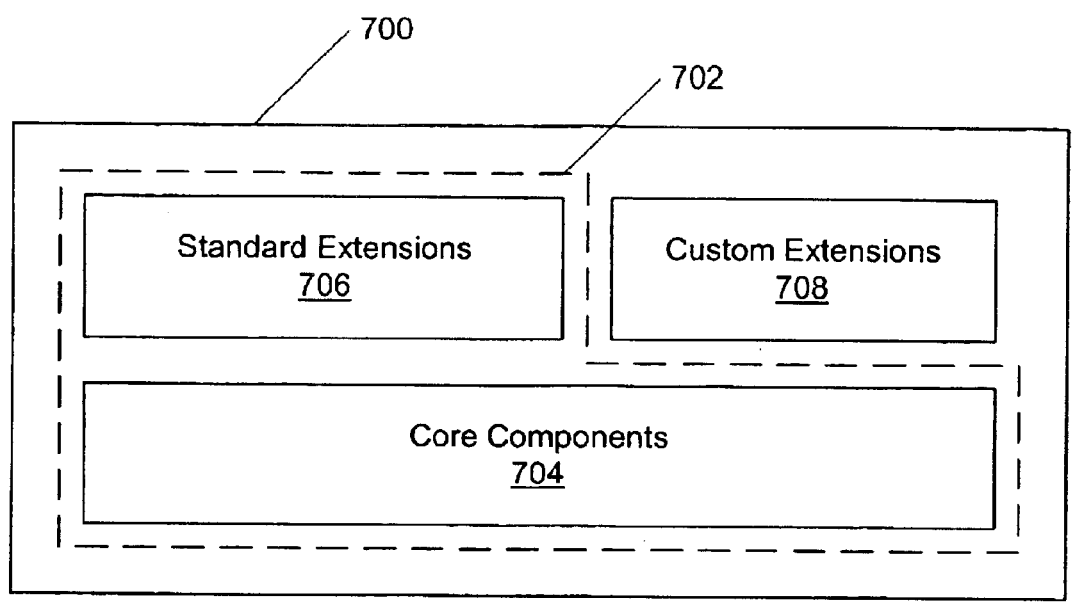
FIG. 7 is a block diagram of a division of distributable components of a smart card product management system according to embodiments of the present invention.

FIG. 7 illustrates a particular embodiment of the present invention which may be utilized in deploying a smart card product management system 50. As seen in FIG. 7, the deployable smart card product management system 700 may include generic components 702 which may be distributed as part of a base smart card product management solution. These generic components 702 may include core components 704, which are those parts of the system that are required by all implementations of a smart card product management system. The function and content of these components do not change from one implementation to the next. An example of a core component are the definitions. All implementations of a smart card product management system will typically require a set of definitions. The type of attributes and functions associated with the definitions will typically not change based on the implementation of the smart card product management system.

The generic components 702 may also include standard extensions 706 which are built on top of the core components 704. The standard extensions 706 represent functions that will be used in most, but not necessarily all implementations of a smart card product management system. Many of the management tasks described herein may be implemented as standard extensions. An example of a standard extension is support for a specific card operating system or support for a specific Personalization Agency interface. A library of standard extensions may be provided with a basic smart card product management system. The set of standard extensions in this library may be sufficient to build a complete smart card product management system, but some of them may be enhanced or replaced by custom extensions to fulfill a specific customer requirement.

The custom extensions 708 are built on top of the core components 704, the standard extensions 706 or both. These extensions may be unique to a specific customer and will typically not be distributed as part of a basic smart card product management system. An example of a custom extension is an extension used to access data that is located outside of the smart card product management system. As an example, when a specific customer maintains their card product holder data outside of the smart card product management system, a custom extension may be used to access this data.

As described above, a core component of a smart card product management system according to embodiments of the present invention are the definition objects. The definitions are used to describe the characteristics and functionality of an object that is managed by the smart card product management system. Definitions can be compared to a template. When the template is filled in, it becomes part of the knowledge-base that is used by the smart card product management system. This knowledge-base provides the basis for issuance and management functions that are processed by the smart card product management system. An implementation of a definition may be used to create multiple instances of the object that is represented by the definition. For example, a card product definition may be used to create instances of card products, and an application definition may be used to create instances of applications. All definitions may be considered core components and, therefore, may not be changed. However, a definition extension can be used to create new definitions and enhance a core definition's function. A definition extension can be implemented as either a standard extension or a custom extension.

Figure 8:
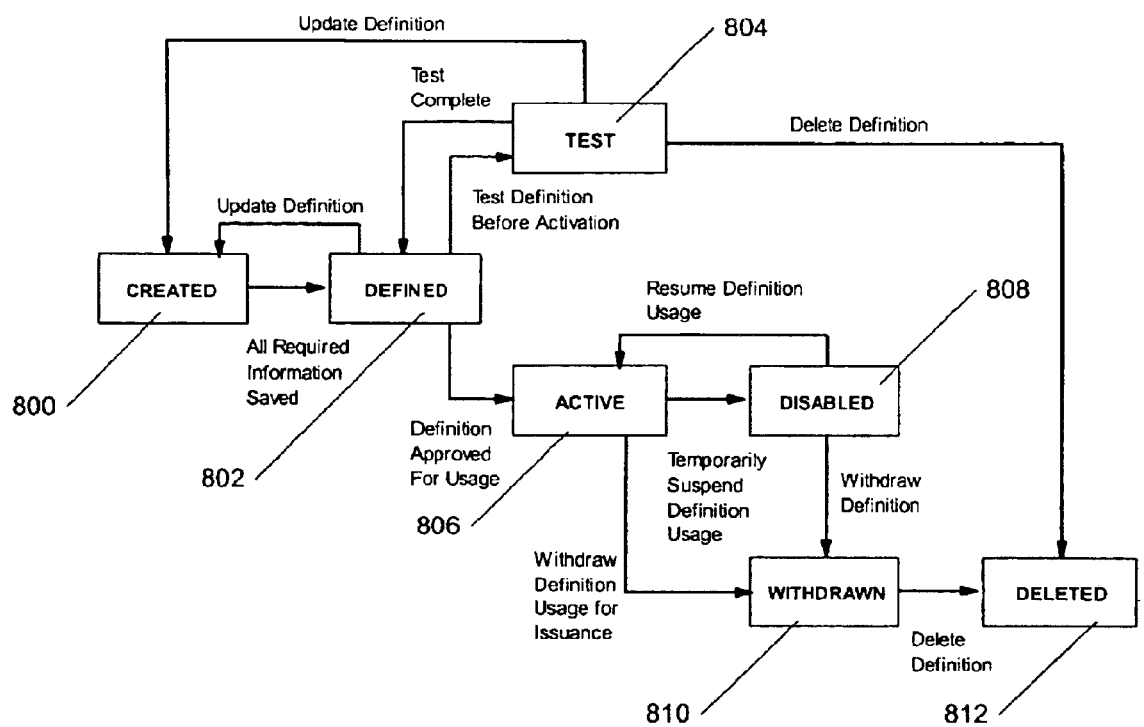
FIG. 8 is a flowchart illustrating the life of a smart card definition object according to embodiments of the present invention.

Each definition has a life-cycle, which is a set of states that a definition transitions through. A typical life-cycle for a definition is shown in FIG. 8. A definition will move from one state to the next when a specific event occurs. For example, when a definition is in the process of being completed, it is in the CREATED state 800. When the definition contains all of its required information and this information is saved in a definitions database, the definition moves to the DEFINED state 802. The event that triggered the state change was the completion and storage of all required information for the definition.

Definitions may also have some state transitions that can not be reversed. For example, when a definition is approved for usage, for example, by entering and exiting the TEST state 804, it will move from the DEFINED 802 to the ACTIVE state 806. Once a definition is in the ACTIVE state 806, the contents of the definition can not be changed. This means that a definition can not transition from the ACTIVE state 806 back to the DEFINED state 802. A definition is updated by creating a new version of the definition.

Thus, the life of a definition, as illustrated in the embodiments of FIG. 8, begins with creating the definition when the definition is in the CREATED state 800. When all required information has been created and saved, the definition will move to the DEFINED state 802. From the DEFINED state 802, the definition will enter the TEST state 804 where the definition is tested before activation. If modifications are need to the definition the definition may return to the CREATED state 800 for updating. When the test is complete, the definition may exit the TEST state 804 and return to the DEFINED state 802. When the definition is approved for use, it will enter the ACTIVE state 806. The definition may be temporarily suspended by placing the definition in the DISABLED state 808. From the DISABLED state 808, the definition may return to the ACTIVE state 806 or be withdrawn from usage and enter the WITHDRAWN state 810. The definition may also be withdrawn directly from the ACTIVE state 806. If the definition has been withdrawn, it may exit the WITHDRAWN state 810 and be deleted by entering the DELETED state 812. Similarly, the definition may be deleted as a result of testing and, therefore, the definition may enter the DELETED state 812 directly from the TEST state 804.

In particular embodiments, definitions may have a common set of attributes: definition ID, version number, type, description, life-cycle state, and valid usage dates. Some definitions will have additional attributes.

The definition ID attribute is a unique identifier (ID), so that a reference to a definition will not be ambiguous. The definition also include a version number attribute that may be used to update a definition's content after it has been activated and used. A new version of a definition can be created from the current version. Initially, the new version will contain the same attribute values, which includes definition references. The type attribute of definition may be used to classify or group definitions which have similar characteristics or usage. The description attribute of the definition is an explanation of the definition usage which is specified using free-form text.

As described above, definitions have a specific life-cycle. The life-cycle is a set of states that a definition can progress through. A definition will move from one state to the next when a pre-defined event occurs. The possible states for all definitions are the same. The life-cycle attribute specifies the current life-cycle state of the definition.

The valid usage date attribute defines the dates within which the definition can be used. This includes a start date and an expiration date. The start date is when the definition can transition to the ACTIVE state. The expiration date is when the definition's usage will expire. On the expiration date, the definition's life-cycle state will transition to the WITHDRAWN state, so that it can no longer be used.

In addition to common attributes, the definitions also support a common set of functions, which includes create, update, delete and query. Some definitions will require additional functions. The create function creates a new definition with a unique identifier. The update function updates the attributes of an existing definition. The delete function deletes a definition The List function lists all versions of a definition, or all definitions for a particular type of definition. The view function views the attributes of a specific definition the link/unlink function link (associate) or unlink an instance of another type of definition to a definition. When linking a definition, the definition that is being linked should be in a DEFINED state.

Definitions also share a common management process and may be stored in the database 94. Definitions may be managed through an administrative user interface that may be provided as part of the administration client 64 and is used to process functions such as create, modify, delete or list definitions. The user interface may be web-based, so that it can be run on a broad range of clients. As the definitions are created, the data associated with the definitions are stored in the smart card product management system database 94. Definitions may contain both the common attributes and definition specific attributes. Some definitions may contain references to other definitions.

Definition versioning may be used to implement change control for updates to a definition, because a definition, in the illustrated embodiments of FIG. 8, cannot be changed after it is activated. The definition versioning function may ensure that the smart card product management system can provide consistent management of the deployed card base. Updates to an existing definition may be initiated by creating a new version of the definition. When a new version of a definition is created, a copy of the definition is created with a new version number and the definition is put into the DEFINED state. All versions of a definition have the same definition identifier (ID), and new versions can be created only from the last active version. All versions of a definition are implicitly linked together. This implies that a new version of a definition must be backward compatible with all old definition versions. This ensures that instance objects that are created from an old definition version can be migrated to a new definition version, if it is required.

Backward compatibility may be accomplished by allowing only a subset of changes to a new definition version. Whereas a completely new definition can be changed in any way that is required, the changes to a new version of a definition must be restricted to ensure compatibility. For example, updates to the definitions that are associated with a new version of a definition may be restricted to adding new definitions and upgrading to new versions of the linked definitions. As an example, after a new version of a card product definition is created, a new application definition can be added to this definition and an existing application definition can be upgraded to the latest version. When these changes are approved and the card product definition is moved into the ACTIVE state, the card product objects that were created from the old definition version can be migrated to the new definition version. After the migration is completed, the new application can be requested and downloaded onto the existing card products.

Definitions may also be imported into the smart card product management system, for example, in XML format. The import function allows other enterprises to provide the information that is related to their participation in the overall scheme. As an example, a chip definition can be provided by the Card Manufacturer, and an application definition can be provided by an Application Provider. When a definition is imported into the smart card product management system, its state will be set to CREATED if the definition is incomplete, or it will be set to DEFINED if it contains all of the definition's required information.

A definition extension can be used to extend the data attributes that are associated with a specific type of definition. A definition extension is implemented as a definition. It will have all of the same characteristics as a core definition, such as an identifier and version number, but it can not be extended using a different definition extension. The primary purpose of a definition extension is to add definition attributes that are not included in the core set of definitions.

As an example, a definition extension can be used to define a card's physical appearance and layout. The definition extension contains the results of designing the card layout. The definition extension may then include the text, images (including logos), and barcodes that will be printed on the card, as well as the data that will be encoded on the magnetic stripe of the card. This type of definition extension can be associated with both the card product and the application definition. By doing this, an application can personalize the physical layout of a card if it is required. For example, a credit/debit application can be loaded onto the chip, and can encode data on the magnetic stripe in order to maintain compatibility with the existing infrastructure of magnetic stripe readers.

Figure 9:
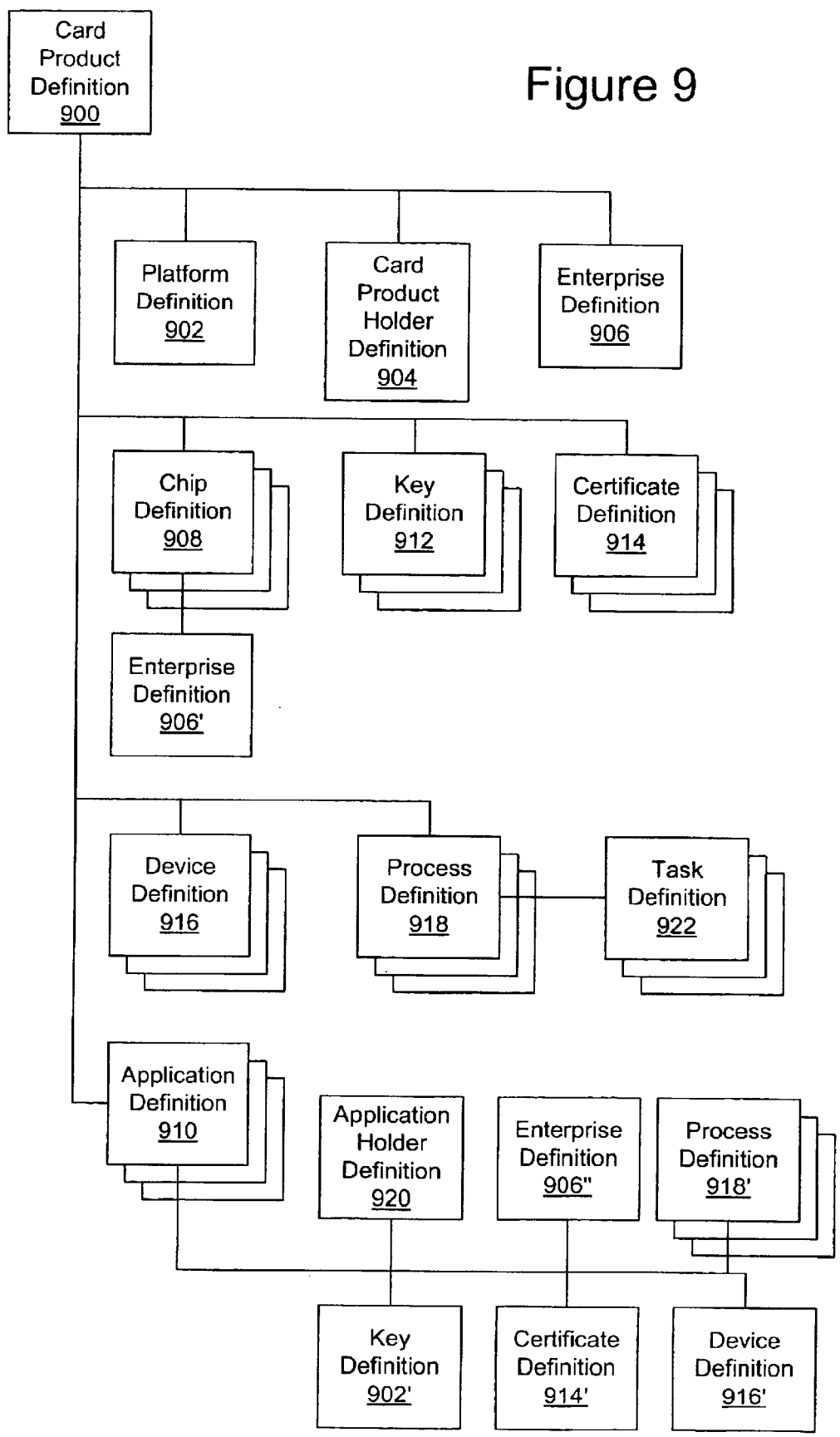
FIG. 9 is a block diagram of a hierarchy of smart card product definitions according to embodiments of the present invention.

As shown in FIG. 9, a hierarchy of definitions may be utilized to describe a smart card product. Such a hierarchy may begin with a smart card product definition 900. The smart card product definition 900 contains the business properties that will affect the issuance and usage of a card-based product. A card product may correspond to the business product that a Card Issuer plans to market. For example, if a Card Issuer wants to issue a Corporate Traveler card, then the card product is the Corporate Traveler card and the card product definition will contain all of the information needed to issue and manage that card product.

The data associated with all of the definitions are stored in the smart card product management system database 94. The definitions may contain references to data that is stored outside of the smart card product management system database 94, such as application management, key and certificate management, and/or legacy databases. For example, the application data that is required to personalize an application may exist only in the application management database. The application definition will contain a reference to the location of the application data, and this reference will reside in the database.

As mentioned above, all of the definitions within the smart card product management system are logically associated with the card product definition 900. The smart card product definition 900, as shown in FIG. 9, contains references to other definitions. Some of the definitions that are referenced by the card product definition may contain references to additional definitions. FIG. 9 illustrates one such set of relationships between the definitions. Some definitions have a one-to-one relationship, and others have a one-to-many relationship. As an example, only one platform definition 902 is associated with the smart card product definition 900, but one or more application definitions 910 can be associated with the same card product definition.

Examples of definitions which may be associated with the card product definition 900 include a platform definition 902, a card product holder definition 904, an enterprise definition 906, chip definitions 908, application definitions 910, key definitions 912, certificate definitions 914, device definitions 916, and process definitions 918. These definitions may have a one-to-one or a one-to-many relationship with the smart card product definition 900. Furthermore, the definitions may be optional or required in a smart card product definition 900.

As is seen in FIG. 9, multiple instances of a single definition may be associated with a card product definition 900. Furthermore, these instances may be linked to other definitions so as to further define the hierarchy. Thus, for example, as seen in FIG. 9, an enterprise definition 906 is linked to the card product definition 900, a second enterprise definition 906' is linked to the chip definition 908 and a third enterprise definition 906" is linked to the application definition 910. Similarly, the process definitions 918 and 918', the certificate definitions 914 and 914', the key definitions 902 and 902', and the device definitions 916 and 916' may be linked to the card product definition 900 and the application definition 910 respectively. Thus, as seen in FIG. 9, links between instances of definitions may be utilized to further define the characteristics of the smart card product associated with the card product definition 900.

Embodiments of the present invention will now be described with respect to a hierarchy of definitions which may provide a hierarchy as illustrated in FIG. 9. As will be appreciated by those of skill in the art, different definitions may be utilized and different hierarchies established while still benefitting from the teachings of the present invention. Accordingly, the definitions and hierarchy described in detail herein are provided to illustrate exemplary embodiments of the present invention. Thus, the present invention should not be construed as limited to the definitions or hierarchy described herein.

In the particular exemplary embodiment of the present invention, the table below identifies whether a definition is optional or required and the relationship to the smart card product definition 900 for particular embodiments of the present invention.

TABLE 1

Definitions Associated with a Smart Card Product Definition

| Definition | Relationship | Required or Optional |
| --- | --- | --- |
| Application | Many | Optional |
| Card Product Holder | One | Required |
| Certificate | Many | Optional |
| Chip | Many | Required |
| Device | Many | Optional |
| Enterprise | One | Required |
| Key | Many | Optional |
| Platform | One | Required |
| Process | Many | Optional |

The example of Table 1 will now be further described. The platform definition 902 defines the card-based platform that will be used for a card product. The platform definition 902 includes information related to the card operating system, and is used to ensure that all of the card product components are defined for the same platform. A platform definition 902 can be associated with most of the other definitions, but there are no definitions that can be associated with it. In addition to the common definitions described above, the platform definition 902 may also have the following attributes.

| | |
| --- | --- |
| Card OS Name | The card operating system on the chip. For example, this could be either Java Card or MULTOS. |
| Card OS Version | The version number for the card operating system on the chip. |
| Card OS Implementor | The enterprise that implemented the card operating system for this chip. |
| Card OS Extensions | The extensions that are available on this implementation of the card operating system. |

The chip definition 908 contains all of the attributes that are needed to issue and manage a chip on a card product. In addition to referring to the chip hardware, the chip definition 908 is used to define the card operating system that will run on the chip. In addition to the common attributes, the chip definition 908 may also have the following attributes:

| | |
| --- | --- |
| Chip Type | The type of chip utilized by the smart card product. |
| Chip Manufacturer | The manufacturer of the chip used on the smart card product. |
| EEPROM Size Available | The amount of storage available on the smart card for application code and data. |

A chip definition 908 may be limited to being associated with one or more smart card product definitions 900.

However, definitions that can be associated with the chip definition 908 include enterprise 906, key 912 and platform 902 definitions. The possible definitions which may be associated with the chip definition and the possible relationships are seen in Table 2.

TABLE 2

Definitions Associated with a Chip Definition

| Definition | Relationship | Required or Optional |
| --- | --- | --- |
| Enterprise | One | Required |
| Key | Many | Optional |
| Platform | One | Required |

The application definition 910 contains the attributes and functions that are needed to issue and manage an application. The attributes include the chip resource requirements for the application, and the source of the personalization data for the application. For a Java Card based smart card product, the application definition 910 is used to define all Java applets. This includes the Card Manager and Security Domains. An application definition 910 is provided for all applications that will run on the card, even if they are installed in ROM. For a MULTOS based card, the application definition 910 is used to define all MEL applications that will run on the card. This includes both shell and standard applications.

In addition to the standard definition attributes, the application definition 910 may include the following attributes:

| | |
| --- | --- |
| Link Allowed | This attribute indicates whether or not another application definition can be linked to this application definition. For a Java Card based smart card product this attribute may be required for applications such as the Card Manager and Security Domain. |
| AID | An application identifier associated with the application. |
| ROM Size Code | The minimum ROM size required for application code (used if application will be put into ROM). |
| ROM Size Data | The minimum ROM size required for application data (used if application will be put into ROM). |
| EEPROM Size Code | The minimum EEPROM size required for application code. |
| EEPROM Size Data | The minimum EEPROM size required for application data. |

The application definition 910 also includes the following functions in addition to the standard functions provided:

| | |
| --- | --- |
| Import Executable | This function receives the application executable code from the Application Developer or Application Provider and stores it securely in the database. The executable is used as input to the application load process (e.g. ALU generation for a MULTOS application). |
| Register Application | All MULTOS applications should be registered with the MULTOS CA before they can be loaded onto a card. Registering an application does not verify or validate the application code or execution, it is only used to identify the application that the Card Issuer 10 will be allowed to load onto a card. After an application is registered, it is assigned a unique identifier (AID). The AID can be used by the smart card product management system to reference the application. |

An application definition 910 can be linked to one or more card product definitions. Optionally, it can also be associated with other application definitions. All of the definitions that can be associated with a card product, except the card product holder definition 904, can also be associated with an application definition 910. For Java Card based smart card products, the application definitions 910 for a Java applet that runs under the control of the Card Manager or Security Domain, are associated with the Card Manager or Security Domain application definition. Only the Card Manager and Security Domain application definitions can be directly associated with a smart card product definition 900.

In addition to the application definition 910, an application holder definition 920 is associated with the application definition 910. The application holder definition 920 is used when requesting personalization data for the application. The source of the data is specified in the application holder definition 920 using a connection definition. Together this information is used to identify the location and type of data required to build the application load package. For a MULTOS based smart card product, the application personalization data will be used, with other specified components, when generating the Application Load Unit (ALU). For a Java Card based smart card product the application personalization data is loaded into an applet, even if the applet is the Card Manager or Security Domain.

Continuing with the description of the present exemplary embodiments, the table below identifies whether a definition is optional or required and the relationship to the smart card product definition 900.

TABLE 3

Definitions Associated with an Application Definition

| Definition | Relationship | Required or Optional |
| --- | --- | --- |
| Application | Many | Optional |
| Application Holder | One | Required |
| Certificate | Many | Optional |
| Chip | Many | Required |
| Device | Many | Optional |
| Enterprise | One | Required |
| Key | Many | Optional |
| Platform | One | Required |
| Process | Many | Optional |

The application definitions 910 that are associated with a smart card product definition 900 are the set of applications that the Card Issuer 10 has validated. The validation process may include verifying and testing the application. Associating an application definition 910 with a smart card product definition 900 implies that the Card Issuer 10 authorizes its usage on the card. Furthermore, when a definition is associated with a smart card product definition 900 it may be validated based on other definitions. For example, when an application is associated with a card product, a check is made to verify that the application can be supported by the chip that is associated with the card product. For example, if the application is written in MULTOS Executable Language (MEL) and is intended to run on a MULTOS card, then the application can not be associated with a card product based on Java Card. Also, the resource requirements for the application, such as memory size and cryptography functions, must be compatible with the card product. Thus, policies and rules may be utilized to manage the creation of a smart card product.

Keys are used by both cards and applications. The key definition 912 provides the information that is needed to manage the keys that are required by a card or application. This definition includes attributes such as the type of key, a reference to the entity that will generate and store the key, and how to recover a key. The key definition 912 is also used to define a PIN that is required by a card product. A PIN is used for card product holder verification. This definition includes information that indicates how the PIN will be generated. For a Java Card based card, the key definition 912 can be used to define the Card Global PIN.

Listed below are attributes of a key definition 912 in addition to the standard attributes and include:

| | |
|---|---|
| Length | The key length. |
| Algorithm | The key algorithm for the key. |
| Modulus | The key modulus. |
| Exponent | The key exponent. |

A key definition 912 can be associated with one or more card product definitions 912, or one or more applications. Exemplary definitions that can be associated with the key definition 912 are listed in Table 4. For a Java Card based smart card product, a key definition 912 can be associated with another key 115 definition, if the key definition it is being linked to is a key set. A key definition 912 is considered to be a key set when the definition type is set to KEY-SET.

TABLE 4

Definitions Associated with a Key Definition

| Definition | Relationship | Required or Optional |
|---|---|---|
| Key | Many | Optional |
| Platform | One | Required |
| Process | Many | Optional |

The certificate definition 914 provides the information that is needed to manage the certificates that are required by a card or application. This definition includes attributes such as the type of certificate, and a reference to the entity that will generate and store certificate. The entity could be an external enterprise. For a MULTOS based smart card product, the certificate definition 914 is used to define both the Application Load Certificate and the Application Delete Certificate, which are used to authorize the application load and delete processes. The only attributes associated with this definition are the common definition attributes.

A certificate definition 914 can be associated with one or more smart card product definitions 900, or one or more applications. The definitions that can be associated with the certificate definition 914 are listed in Table 5. The table below identifies, the exemplary embodiments, whether a definition is optional or required and the relationship to the smart card product definition 900.

TABLE 5

Definitions Associated with a Certificate Definition

| Definition | Relationship | Required or Optional |
|---|---|---|
| Key | Many | Optional |
| Platform | One | Required |
| Process | Many | Optional |

The process definition 918 can be used to directly generate and store certificates. When this is done, the process definition 918 contains a reference to the system that will be used to generate and store the certificates. If this system is maintained by another enterprise, then this is a reference to a connection definition.

The connection definition contains the information that is required to communicate with systems that are external to the smart card product management system. The external systems can be located either within the same enterprise or they can be located in a different enterprise. When the systems are located in a different enterprise, the connection defines the method that will be used to transmit card management transaction data between enterprises. Communication connections may be pluggable components. In general, a communication connection understands the protocol that is used to communicate between the smart card product management system and an external system. The card management transaction data that flows between the systems may be independent of the protocol. As described above, card management transactions may use an XML data format.

Figure 10:
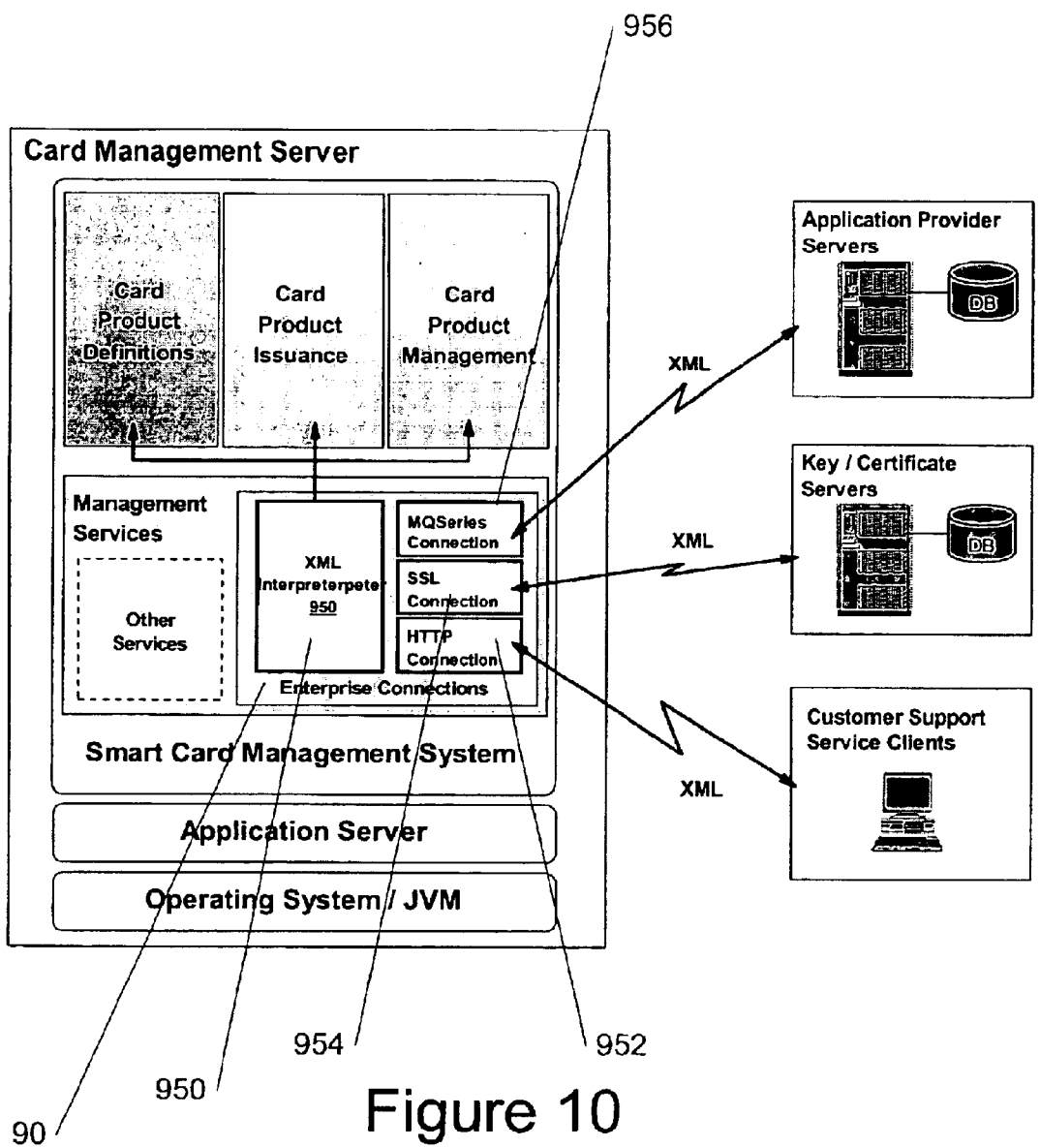
FIG. 10 is a block diagram of a communications aspect of embodiments of the present invention.

An example of a set of enterprise communication connections can be found in FIG. 10. Each type of connection is used to communicate with a different type of client or server. The data that flows across the connection may be an XML formatted data stream. As seen in FIG. 10, connections may be of different types and may be provided by the enterprise connections service 90 and may include, in an XML based embodiment of the present invention, an XML interpreter 950, as well as components for the supported connection types, such as HTTP connections 952, SSL connections 954 and MQ series connections 956. The XML Interpreter 950, as illustrated in FIG. 10, is responsible for routing the incoming transactions associated with the smart card product management system 50, and for sending transactions responses back to the client or server that originated the transaction request. Thus, as seen in FIG. 10, an MQ series connection may be utilized to communicate with certain clients or servers, such as the application provider server 54, an SSL connection may be utilized to communicate with other clients or servers, such as the key/certificate servers 56, and other connection types such as an HTTP connection may be utilized to communicate with clients or servers, such as the customer support service client 60.

In addition to the standard definitions, a connection definition may include a System Extension attribute which may include the executable code that is used to send data across a specific connection.

A connection definition can be associated with other definitions, such as the card product holder 904 and application holder definitions 920. In the present exemplary embodiments, the only definition that can be associated with the connection definition is the enterprise definition 906. The enterprise definition association is optional and may only be a one-to-one association.

An enterprise represents a single participant in a card management scheme. Each enterprise is uniquely identified by an enterprise definition 906. The attributes of the enterprise definition 906 may include information such as the enterprise name and address. In addition to the standard attributes, the enterprise definition 906 may also include the following attributes:

| | |
|---|---|
| Name | The name of the enterprise. |
| Address | Mail/postal address where this enterprise can be contacted. |
| Authorized Contact Person(s): | The person(s) who are authorized to be the point of contact for this enterprise. The contact information may include the person's name, title, phone number, etc. |

An enterprise definition 906 can be associated with one or more card product definitions 900, application definitions 910, chip definitions 908 or connection definitions. The enterprise definition 906 does not have any other definitions that can be associated with it.

The card product holders are the consumers for a card product. The card product holder definition 904 contains information that can be used to locate the source for card product holder data. This definition can be associated with more than one card product definition 900. An instance of a card product holder may contain the actual card product holder data. The instance of a card product holder can also be associated with one or more card products. The only attributes associated with this definition are the common definition attributes. A card product holder definition 904 can be associated with one or more card product definitions 900. An associated connection definition may provide the reference to the source for the card product holder data. The potential sources for card product holder data may include an existing legacy database or the database. The following definitions can be associated with the card product holder definition 904.

TABLE 6

Definitions Associated with a Card Product Holder Definition

| Definition | Relationship | Required or Optional |
|---|---|---|
| Connection | One | Required |
| Platform | One | Required |
| Process | Many | Optional |

As described above, an application holder definition 920 is a reference to the data that describes the user of a specific application on a card product. This definition contains information that can be used to locate the source for application holder data. An instance of an application holder will contain the actual application holder data. The only attributes associated with this definition are the common definition attributes. An application holder definition 920 can be associated with one or more application definitions. The connection definition provides the reference to the source for the application holder data. The potential sources for card product holder data may include an existing legacy database or the database. The following definitions can be associated with the application holder definition 920.

TABLE 7

Definitions Associated with an Application Holder Definition

| Definition | Relationship | Required or Optional |
|---|---|---|
| Connection | One | Required |
| Platform | One | Required |
| Process | Many | Optional |

A device represents the card acceptance device where a card-based product can be used. The device definitions 916 can be used to determine which devices are certified to support specific cards and applications. The device definition 916 can also include information such as the device type, location, and ownership. Thus, in addition to the standard attributes, the device definition 916 may include the following attributes:

| | |
|---|---|
| Name | The name device where a card product or application can be used. |
| Version | The version of the device that is supported. |

A device definition 916 can be associated with one or more card product definitions 900, or one or more application definitions 910. This definition does not have any other definitions that can be associated with it.

A process is a set of tasks that are used to complete a defined issuance or management function. A process definition 918 is used to identify the set of tasks that represent a complete process. The process can be executed using, for example, an entry-level process service or enterprise-based workflow manager. An example of a process definition 918 is a card issuance order, or a post-issuance order to update one or more cards. The process definition 918 provides the basis for identifying and executing the card product issuance or post-issuance update tasks.

Tasks can execute entirely within the domain of the card management server 52, or they may require communication with other systems. The amount of time that is required to complete a task will depend on the work items that it needs to complete, and the processing that is required outside of the smart card product management system.

The process definition 918 can reference to a set of tasks using one of the following methods. First, the process definition 918 can contain a reference to one or more task definitions 922. Each task definition 922 contains the information that is needed to execute a single task. Alternatively, with an enterprise workflow manager, task definitions 922 may not be required, because the tasks are defined and imported using the facilities provided by the workflow manager. As task definitions 922 are not required, the process definition 918 may contain the information that is required by the workflow manager to locate and run the process.

An entry-level process service may be used to execute a set of tasks in a serial order. Tasks in a process may be executed in a serial sequence with the work completed by one task provided as a prerequisite to start the next task. Using the card issuance order as an example, the task that issues the order to manufacturer cards must be completed before starting the task that will personalize the card. Although the tasks are processed in a serial order, this does not imply that the output from one task is required to be used as input into the next task. In general, all input required for a task is obtained from the smart card product management system database 94, and all output from a task is stored in the smart card product management system database 94.

An entry-level process service may be utilized in certain embodiments of the present invention as a simple work flow process may be all that is needed in particular system, such as systems which do not require integration with other enterprise work flow processes. For example, an employee badge issuing system that is located in the local security office may only need simple, serial process flows for fulfillment of a personalization request for a single card.

In larger enterprises a more comprehensive workflow process may be need, for example, if the card management processes are integrated into an existing workflow product. Thus, when a process is executed within the context of a large enterprise, it may require a more complex flow than provided by an entry-level process service. For example, instead of executing the tasks of a process in a serial order, some tasks may have to be processed in parallel to one another, with the workflow manager responsible for synchronizing the completion of these tasks. A task may also require that data from one or more previous tasks be passed to it as input. This type of inter-task communication may be handled by the workflow manager. In addition, an enterprise process flow may include both automated operations as well as operations that require interaction directly from the enterprise's employees. For example, an automated operation would be the collection of required data from the smart card product management system database 94. An interactive operation would be an approval process for a new card order.

An example of a product that provides this type of workflow management function is IBM MQSeries Workflow. This product is a workflow management system that provides the capability to define, manage, and execute business processes. These processes are executed by software whose order of execution is driven by a computer representation of the workflow logic. The MQSeries workflow management system includes a process definition function, through which the workflow is modeled, a control function, which manages the flow of work at run time, and interfaces which enable human users and applications to perform the specific business actions within the workflow. These aspects of the workflow management system may be controlled by the process definition 918.

In light of the above discussion, in addition to the standard attributes, the process definition 918 may further include a task list attribute. The task list attribute provides the list of tasks that will be executed by this process. Each task will be executed in the order that they appear in the list.

A process definition 918 can be associated with one or more card product definition 900, application definition 910, key definition 912 and certificate definition 914. The only definition that can be associated with this definition is the task definition 922. A task definition 922 is used to define the functions that are executed in the context of a task. The task definition 922 is required only if it is required by the service that will control the execution of the process.

A task definition 922 contains a reference to executable code and the initialization parameters for that code. A task is a single step within a process. The list of tasks that make up a process are specified in a process definition 918 as task definitions 922. In addition to the standard attributes, the task definition 918 may have a System Extension attribute which provides the executable code and initialization parameters that are used to process a specific task. A task definition 922 can only be associated with one or more process definitions 918. The only definition that can be associated with the task definition 922 is the connection definition in an optional one-to-one relationship.

The smart card product management system may also include a set of standard definition extensions, such as support for customizing the physical components for a smart card product. The card component definition may contain a description of the card's physical components, which includes its appearance and layout. This definition is not used to design a card layout. Instead, it can be viewed as a template that contains the results of designing the layout. This definition will include the text, images (including logos), and barcodes that will be printed on the card, as well as the data that will be encoded on the magnetic stripe of the card. A card component definition can be associated with both the card product definition 900 and the application definition 910. By doing this, an application can personalize the physical layout of a card if it is required. For example, a credit/debit application can be loaded onto the chip, and can encode data on the magnetic stripe in order to maintain compatibility with the existing infrastructure of magnetic stripe readers.

The card component definition can be used to define different types of physical layout attributes for a card. These attributes are in addition to the common definition attributes and may include:

| | |
|---|---|
| Plastic | Defines the type of plastic that is required for the card. |
| Text | Defines an area on a card where a text string will be printed, embossed or indented. |
| Image | Defines an image and an area on the card where the image should be printed. |
| Magnetic Stripe | A definition of the magnetic stripe data which will be encoded on the card during personalization. |
| Barcode | Defines barcode data that will be used during personalization. |

The card component definition can be associated with one or more card product definitions 900, or one or more application definitions 910. The card component definition need not have any other definitions that can be associated with it.

The management tasks carried out by the smart card product management system may include card product issuance tasks, application data management tasks, and card product management tasks as illustrated in FIG. 5. Some of the management tasks, such as the enablement and personalization processes, may be encapsulated in process definitions. A process can be initiated either manually by a person who has the required authorization, or it can be started automatically. The processes that are started automatically are usually triggered by a management event.

The management tasks rely on a complete set of definitions. In particular, they utilize the definitions to create the objects that will be managed by the smart card product management system. All of the objects that are managed by the smart card product management system are representations of real world objects within the scheme. For example, a card product definition 900 is used to create one or more card product objects. The card product object is used to represent a single instance (or occurrence) of a real (physical) card which will be enabled, personalized, and used by a person referred to as a card product holder. Thus, the card product is an instance of a card that is defined by a specific card product definition 900. A chip object results from the completion of the card manufacturing process. This object is used to carry the unique card ID from the enablement process into the personalization process. An application represents a single occurrence of an application that has been loaded onto a card product. A card product holder is the person who is given a card product to use. An application holder object corresponds to the person who uses a specific application that has been loaded onto a card product. A key holder object is an instance of a key that is used on a card product. A certificate is an instance of a certificate used by a card product.

The objects that are managed by the management tasks may have a life-cycle that consists of a set of states that the object will transition through over a period of time. Each type of object may have a different definition for its life-cycle, which includes different processing when moving from one state to the next state. All managed objects will have a default set of states and state transitions that define its life-cycle. Both the states and states transitions can be either partially modified or completely replaced so that they adhere to a specific customer's requirements.

Figure 11:
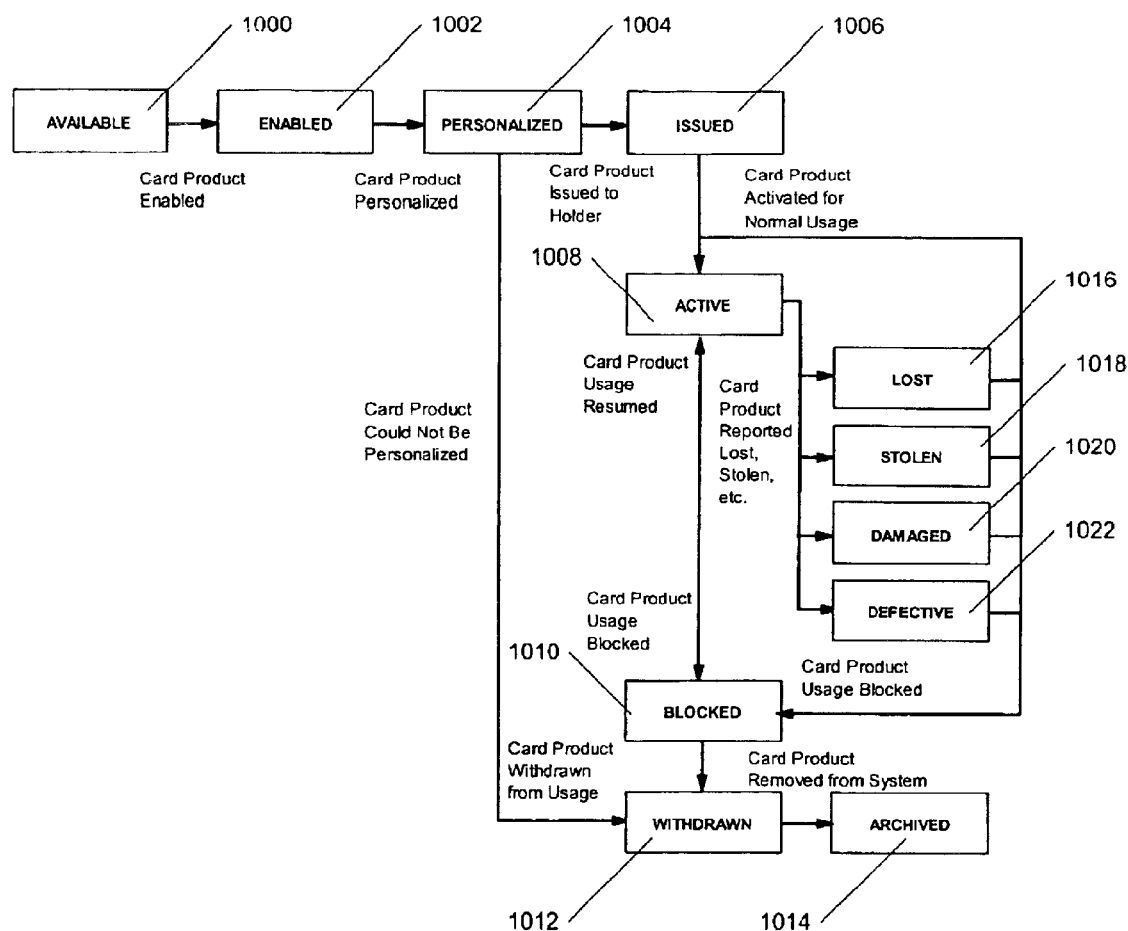
FIG. 11 is a block diagram illustrating smart card product states according to embodiments of the present invention.

FIG. 11 illustrates a set of the possible states for a card product according to particular embodiments of the present invention. The card product life-cycle definition may change based on factors such as the scheme, Card Issuer, and card product requirements. Similar to the definition life-cycle states, the state transitions for managed objects can not be reversed. Using the card product states as an example, the card product initially starts in an AVAILABLE state 1000. The card product is enabled and enters the ENABLE state 1002. From the ENABLED state 1002 the card product is personalized and enters the PERSONALIZED state 1004. When the card product is issued to the holder, the card product enters the ISSUED state 1006. When a card product is activated for usage, it will move from the ISSUED state 1006 to the ACTIVE state 1008. Once a card product is active, the card product can not transition back to the ISSUED state 1006, or any state that occurred prior to the ISSUED state 1006. If card product usage is blocked for any reason, the card product enters the BLOCKED state 1010. The card product may return to the ACTIVE state 1008 from the BLOCKED state 1010. For example, if the card product is reported as lost, the card product enters the LOST state 1016 until it is block from usage. Similarly, if the card product is reported stolen, defective or damaged, the card product enters the STOLEN state 1018, the DEFECTIVE state 1022 or the DAMAGED state 1020, respectively, until usage of the card is blocked. If the card product is withdrawn from usage then it enters the WITHDRAWN state 1012 and when removed from the system the card product enters the ARCHIVED state 1014.

Figure 12:
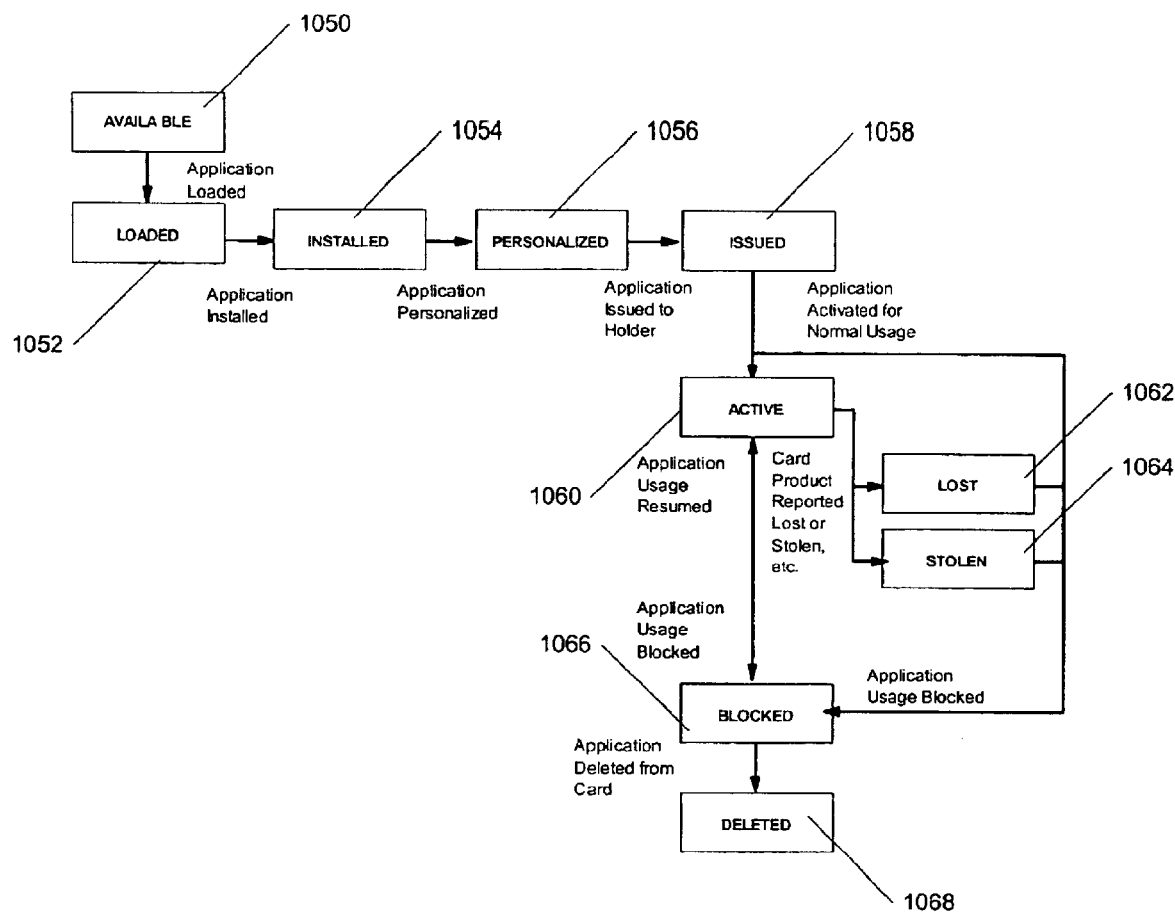
FIG. 12 is a block diagram illustrating application states according to embodiments of the present invention.

An application is another example of a managed object that has a specific life-cycle. An example life-cycle is illustrated in FIG. 12. The application states may change based on factors such as the card operating system, Card Issuer and Application Provider requirements. In the example illustrated in FIG. 12, the application initially begins in the AVAILABLE state 1050 and upon loading enters the LOADED state 1052. When the application is installed, the application enters the INSTALLED state 1054 and when the application is personalized, the application enters the PERSONALIZED state 1056. When the application is issued to the card holder the application enters the ISSUED state 1058 and enters the ACTIVE state 1060 upon activation. The application may also enter the BLOCKED state 1066 prior to activation. From the ACTIVE state 1060, the application may enter the LOST state 1062 or the STOLEN state 1064 prior to entering the BLOCKED state 1066.

Figure 13:
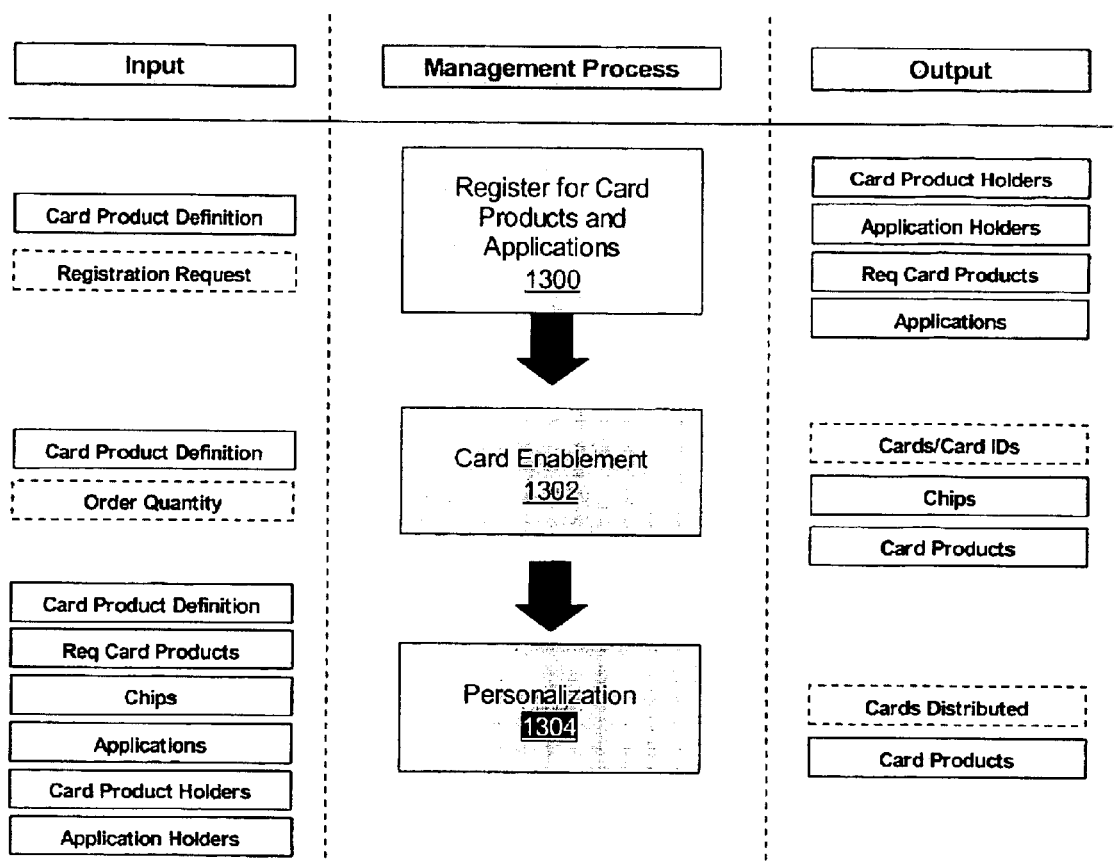
FIG. 13 is a block diagram illustrating a card product issuance process according to embodiments of the present invention.

As illustrated in FIG. 13, the issuance process contains three primary functions: registration for card products and applications 1300, the card enablement process 1302, and the personalization process 1304. In FIG. 13, the inputs and outputs of each process are also illustrated. The registration function 1300 creates an association between a request for a card product and card product holder, as well as an application and application holder. This process will also create objects that are required for a card product issuance request. The card enablement process 1302 creates a card with an unique card identifier, and associates a card with a specific Card Issuer 10. After a card is enabled, only the Card Issuer 10 can authorize changes to the contents of the card. The personalization process 1304 makes a card and its applications specific to a card and application holder. Together these functions are used to initially issue and reissue a card-based product. The card product issuance components can support different types of issuance processes, such as centralized, mass issuance or decentralized, single issuance.

The complete card product issuance process has a specific flow that usually starts with the registration process, and is followed by the card enablement and personalization processes. The issuance process as described with reference to FIG. 13 assumes that the card product and its applications have an associated card product holder and application holder.

Generally, all card products and applications will have a corresponding card product and application holder. The card product holders and application holders are created during the registration process. Registering card product and application holders is optional only if the card product holder will be anonymous. A card with an anonymous card product holder can be personalized to a specific card product holder after the card is issued.

The card enablement and personalization processes are initiated using a card product issuance order. The issuance order can be initiated using an automated process or it can be started manually. The automated ordering process can be triggered based on hitting a threshold of pending card product requests, or it can be started at specific time intervals. When a time interval is used, an order is initiated only when there are pending card product requests that need to be processed.

The registration process 1300 is provided by either the Card Issuer or Registration Authority. The primary purpose of this function is to register a person for a card product, and one or more applications associated with the card product. From the Card Issuer's perspective, the person that is associated with a card product is called a card product holder. The Application Provider view of the card product holder is represented by the entity called the application holder. The registration process 1300 results in the acquisition of personal card product holder and application holder data.

The card product holder and application holder data may be used to personalize the smart card chip, as well as the external card plastic. Address data may be used for PIN mailings and smart card product distribution. This data may also be used to correlate the card product holder with an application, for example a bank account number. The smart card product management system manages the creation and maintenance of this data.

Figure 14:
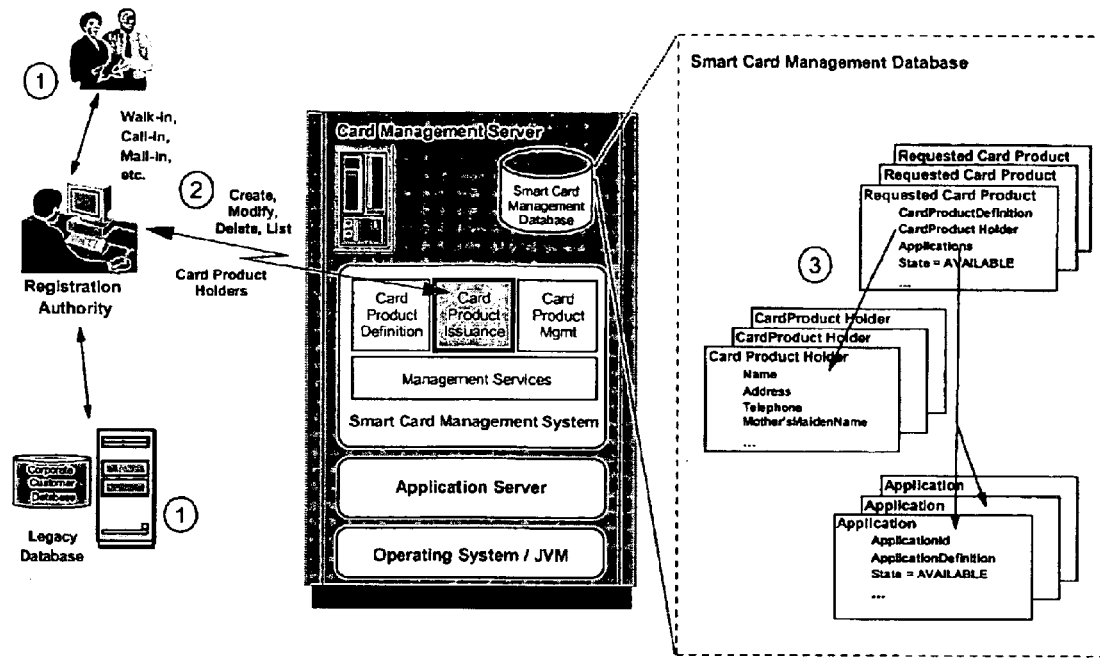
FIG. 14 is a block diagram illustrating card product registration according to embodiments of the present invention.

The registration process 1300 is shown in more detail in FIG. 14. As seen in FIG. 14, the card product holder and application holder data can be obtained through a registration process or from data that already exists in a legacy database or from other sources. Potential card product holders can register for a card product using different methods. The acceptable methods will be defined by the Card Issuer. For example, registration may be by mailing a registration form to the Card Issuer, walk-in to a Registration Authority, calling a Customer Service Center or on-line registration through, for example, the Internet. This information may be utilized to create an instance of a requested card product.

As is further seen in FIG. 14, the Registration Authority may use an administrative user interface to create, modify, delete, or list instances of card and application holders. When a card product or application holder is created, a new instance of this object is created and the data associated with the card product or application holder is stored in the smart card product management system database 94.

A card product holder is associated with a specific instance of a requested card product, and an application holder is associated with an instance of an application that resides on the card product. The requested card product is a separate object from a card product, and is used only to track requests for a card product. After the request is fulfilled, the requested card product object is deleted, since it is no longer required.

The card enablement process 1302 is defined using a process definition, which contains a set of tasks. As an example, a enablement process according to one embodiment of the present invention is described below. Since this process is defined using a process definition, it can be customized to meet a specific Card Issuer's requirements.

In the example enablement process three tasks are provided.

1. Request Cards: Order a batch of cards from a card manufacturer.

2. Request Control Key: Obtain or generate the control key that will be used to enable the card and make it card issuer specific.

3. Enable Card: Send the control key information to the card manufacturer to enable one or more cards.

Data that is common to all cards of a card type may be loaded onto the card when it is enabled. The card enablement tasks result in a set of enabled cards that can be personalized under the authority of the Card Issuer.

With Java Card, a Card Manager unique to the Card Issuer is loaded onto each card to control subsequent authorized and secure installation of applets on the card, card global data personalization, card life-cycle management, and mapping of an Application Provider's Security Domains.

With MULTOS, the cards are enabled by loading the MULTOS Security Manager (MSM) Controls Data onto the chip. All enabled cards can be referenced using a unique card ID.

Figure 15:
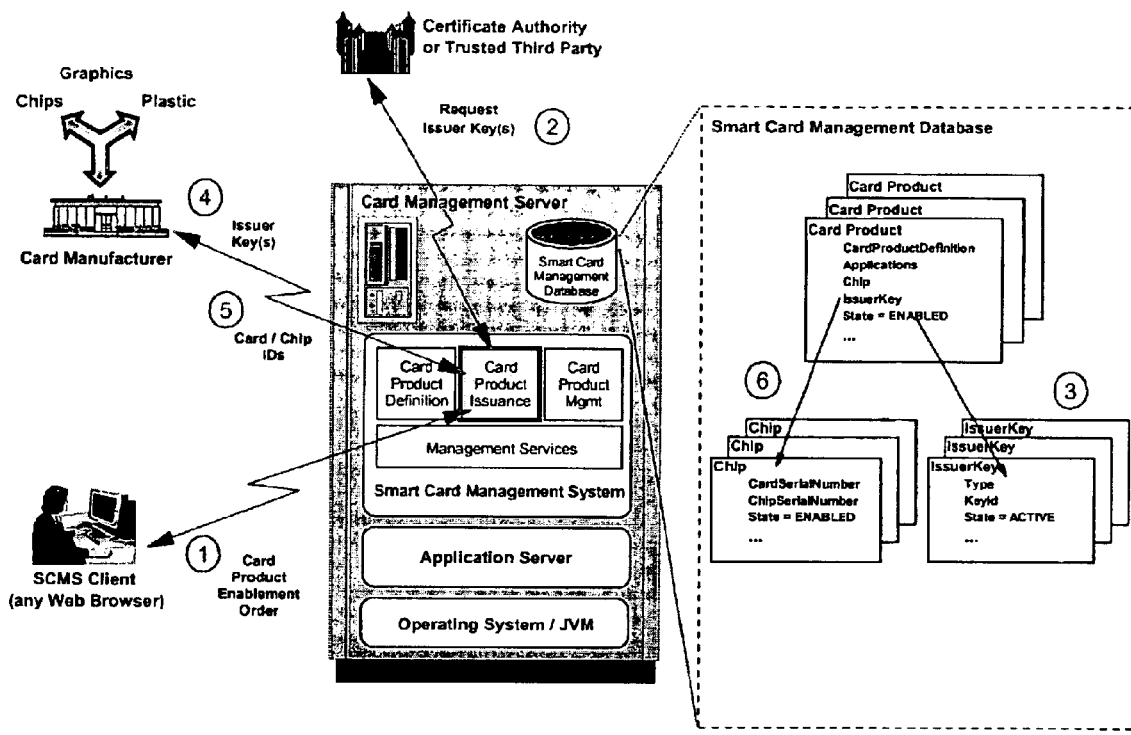
FIG. 15 is a block diagram illustrating card product enablement according to embodiments of the present invention.

The functions performed by the card enablement tasks are illustrated in FIG. 15. Each of the tasks in this process may utilize the following functions:

Request Cards
  1. Enablement Order:
    An order is placed with a card manufacturer for a specific number of cards. The chips are embedded in the plastic card during manufacturing. Plastic (non-personalized) printing may also be performed at this time. For MULTOS, as part of the manufacturing process, a unique identifier (ID) is read from the chip, and used by the to uniquely identify a chip instance and associate it with the plastic card in which it is embedded. After the cards are manufactured, the card IDs are returned to the Card Issuer. The unique card ID is called the MULTOS Carrier Device ID, or MCD_ID.

Request Control Key
  2. Request Control Key
    The control key is used to assign control of the card to the Card Issuer. Each card operating system will have a different type of control key. The control keys that are used on Java Card are the Card Manager key sets that are owned by the Card Issuer. The key sets are used to establish a secure channel for communications with the card and to verify the signature for load and install commands. For MULTOS, the MCD_ID is used to configure security parameters for each card within a domain of the Card Issuer's card base, giving the Issuer complete control over loading and deleting applications on the card. These security parameters are acquired from the MULTOS CA by requesting MSM Controls Data The smart card product management system supports the association of MSM Controls Data with each specific card.
  3. Store Control Keys in Database
    If a new set of control keys were generated for the cards, then references to the keys are stored in the database.

Enable Card:
  4. Enablement Data Sent to Card Manufacturer
    The control keys for the card are sent to the card manufacturer to enable the card. Enabling a card makes the card specific to a Card Issuer. After a card is enabled, only the Card Issuer can authorize changes to the contents of the card. After a card with Java Card is enabled, the Java virtual machine is running and the Open Platform functions are available. Card enabling may also include the loading of applications and activating of ROM applications like the Card Manager. With Open Platform support, making the card ready to run and loading applications are two different procedures. After this process is complete, the Java Card is in the SECURED state. This state indicates that the Card Manager should enforce the Card Issuer's security policies for application loading and deleting. For MULTOS, the cards are enabled by loading the MSM Controls Data onto the chip. Completion of this function makes the card specific to a Card Issuer.
  5. Receive Card ID List
    For Java Card, the list of card IDs are not received from the card manufacturer. The card IDs are obtained after the card is personalized. For MULTOS, after the cards are enabled, the list of card IDs are sent from the card manufacturer to the Card Issuer.
  6. Update Database
    In the smart card product management system database 94, new objects are created and existing objects are updated based on completion of the enablement process. For Java Card, card objects are created in the database, but they are not updated with a unique card ID until after the personalization process has been completed. For MULTOS, the card ID list is used to create card objects in the database. One card object is created for each card ID in the list.

The personalization process is defined using a process definition, which contains a set of tasks. This process must follow the card enablement process, since the personalization process requires an enabled card (a card under the control of the Card Issuer). The personalization process takes a card that is owned and controlled by a Card Issuer and updates it to make it specific to a card product holder. The personalization process will typically include four tasks, which are completed in a serial order.

1. Request Application Data: Obtain a list of card IDs for a batch of cards that have been manufactured.
2. Request ALC (MULTOS Only): Request an Application Load Certificate from the MULTOS CA. This task is for MULTOS only and is not needed for Java Card.
3. Personalization: Generate the personalization data and send it to the Personalization Agency where the card and its applications will be personalized.
4. Distribute Card: Ensure that the cards are distributed to the card holders, and PIN letters are sent.

Figure 16:
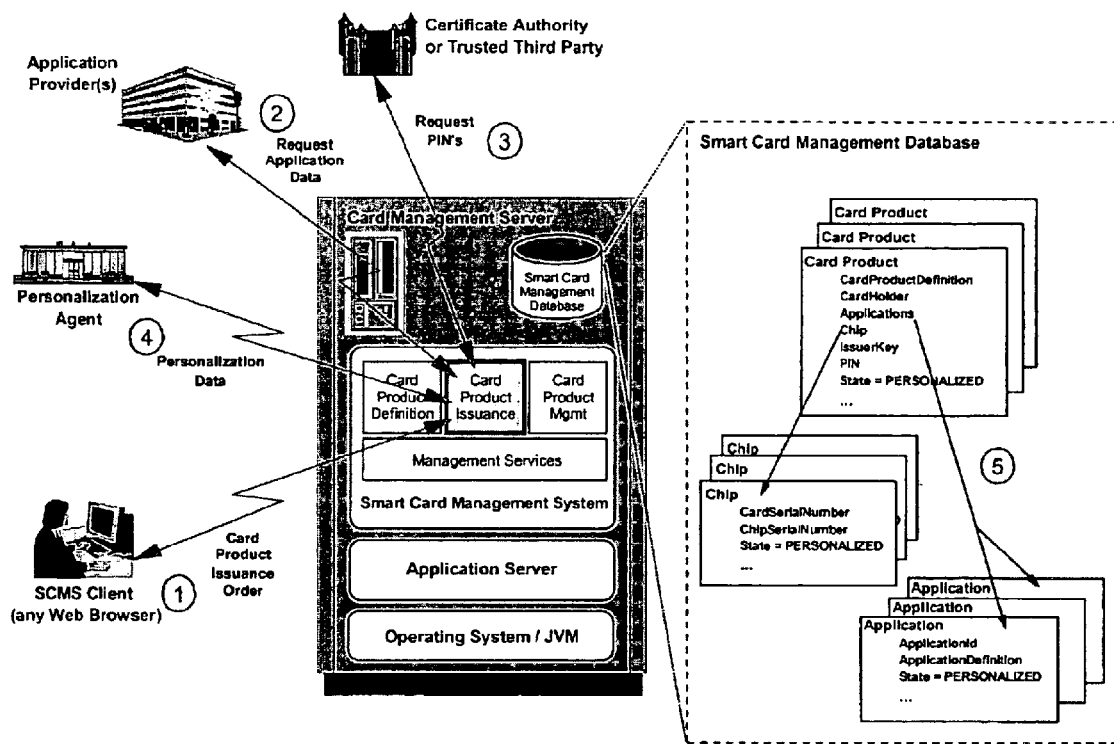
FIG. 16 is a block diagram illustrating card product personalization according to embodiments of the present invention.

The first three tasks of the personalization process are illustrated in FIG. 16.

These tasks carry out the following functions:

Request Application Data:
  1. Personalization Order
    A personalization order is initiated by or on behalf of the Card Issuer to personalize and distribute a set of cards.
  2. Request Application Personalization Data
    All application personalization data must be requested from the Application Provider. The request will be sent with a reference to an application holder, which is used by the Application Provider to identify the data that needs to be gathered and returned to the Card Issuer.

Request ALC (MULTOS Only):
  3. Request ALC
    A card may have a set of unique keys that may be required to load data or applications onto the card. For example, each MULTOS card has a unique cryptographic key pair. The public key for a card can be used to encrypt an ALU, so that the ALU will be specific to that card. An Application Load Certificate (ALC) may be acquired from the MULTOS CA for each application that will be loaded onto a card. The ALC is signed by the MULTOS CA and used by the card to verify that the Card Issuer authorized the application load request. The ALC request originates from the Card Issuer, but the certificates can be delivered to either the Card Issuer or the Personalization Agency. There are three different ways that these certificates can be used: one certificate for all cards, one certificate for a set of cards, or one certificate per card.

Personalization:
  4. Create and Send Personalization Data
    Personalizing an application updates the application's data so that it is specific to a card product holder. During this task the application code and personalization data are combined into one package that is sent to the personalization agency. The personalization agency is responsible for the actual personalization process. For Java Card, the Card Issuer signs the set of install and load commands and sends them to the application load facility. When an asymmetric key is used to generate the signature, one set of commands is valid for all cards. When a symmetric key is used to generate a MAC based signature, then one set is needed for each card. The load commands are built from the Java Card CAP file which holds the applet prepared by the Application Provider. In contrast to the MULTOS ALUs, the Java Card load commands hold only the application code. Applet personalization is performed under the complete control of each applet. Applets can be installed under the Card Manager (the Card Issuer's domain) or an Application Provider's Security Domain. A Security Domain is installed on a card under the control of the Card Issuer's Card Manager. The Security Domain then controls the authorization and secure installation of the Application Provider's applets. When the personalization process is completed, a list of card IDs are returned to the Card Issuer.

For MULTOS, an Application Load Unit (ALU) containing the source code, data and necessary installation data for an application is created by the Application Provider, using an ALU Generator. These load units can include the personalization key for an application, in which case the ALUs are bound to a specific card. The ALU and ALC are required to install an application on the card.

Figure 17:
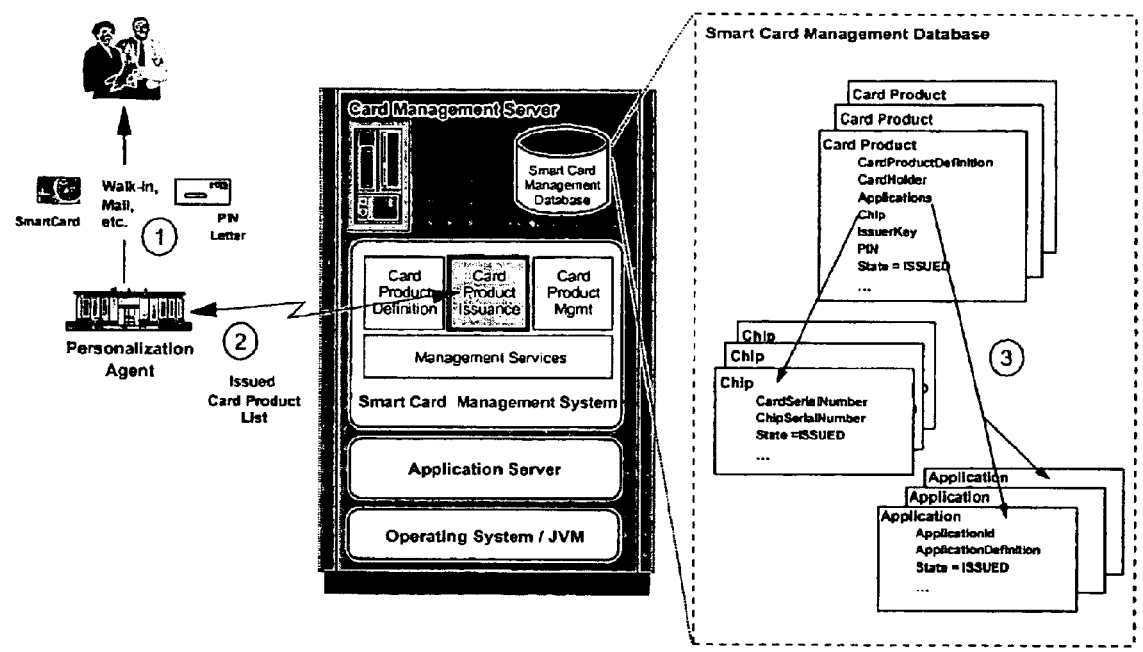
FIG. 17 is a block diagram illustrating card product distribution according to embodiments of the present invention.

The processing for the card distribution task is shown in FIG. 17. The card distribution task may carry out the following operations:

Distribute Card:
  1. Distribute Card to Card Product Holder
    Cards may be mailed directly to the card product holder or picked up at a Registration Authority. Card packets may be prepared and sent to a card distributor to be stocked in vending machines or distributed further to retailers. The smart card product management system will generate PINs and PIN letters to be mailed to card holders as part of the issuance process, when a PIN-based application is installed on the issued card.
  2. Receive Distribution Acknowledgment
    The distribution agent sends the Card Issuer a list of cards that were sent to card holders.
  3. Update the Smart card product Management System Database
    The list of distributed cards are used to update the status of the objects in the database to indicate that they are issued.

Application data management may provide access to the application data that is required by other card management tasks, such as application issuance.

For each MULTOS card that will be personalized by a Personalization Agency, an Application Load Unit, Application Load Certificate and application personalization data required for card physical layout personalization is collected and sent to the Personalization Agency. For each Java Card, Application Provider Security Domain(s) and applets from the Application Provider, as well as personalization data for each applet are sent to the Personalization Agency. For either type of card, the smart card product management system may support the acquisition, preparation and distribution of this data to a Personalization Agency.

When a card is lost, stolen, or damaged and needs to be replaced, the application personalization process during reissuance may access the latest updates to the application data. This data may be stored in the Application Provider's database and accessed there during reissuance, or it can be periodically synchronized to the Card Issuer's database so that it can be retrieved there during reissuance.

Generation and maintenance of keys for secure transport, installation and access of on-card applications may also be supported in embodiments of the smart card product management system according to the present invention.

The card product management function provides the post-issuance and/or multi-enterprise management support.

Figure 18:
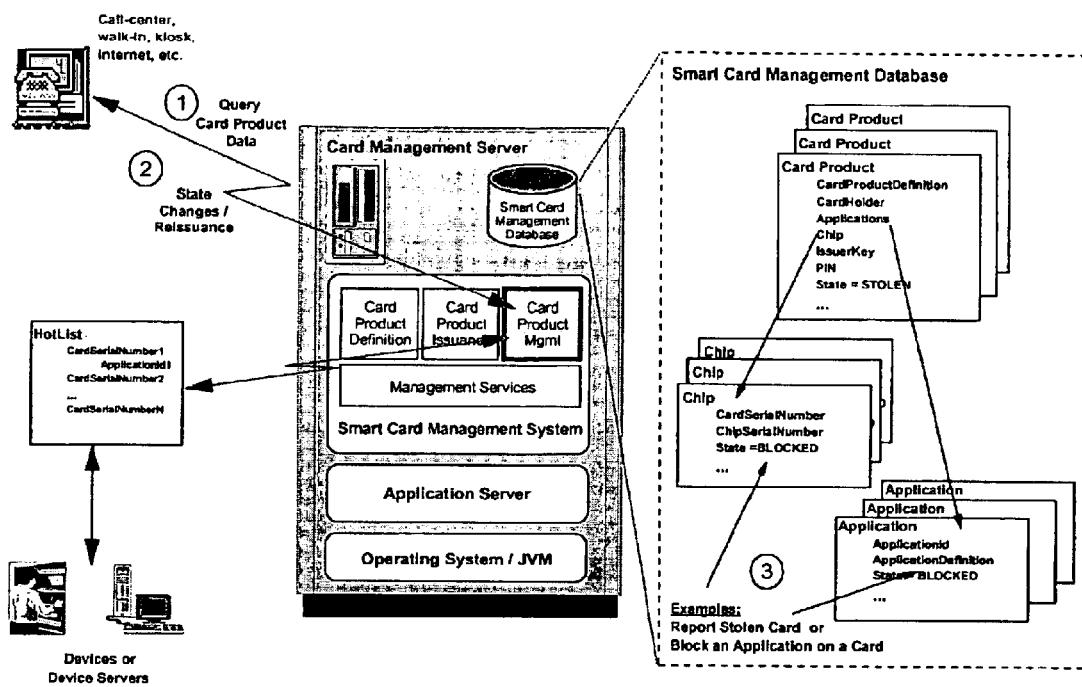
FIG. 18 is a block diagram illustrating operations for customer support services according to embodiments of the present invention.

The Customer Support Service function of the card product management, also referred to as a Call Center or Service Center, is usually the card holder's initial point of contact when they have problems with a card product or they need to request administrative functions for a card product. FIG. 18 illustrates an overview of embodiments of the customer support service interface. The customer support services may utilize the following functions:

1. Query Card Management Data:

This interface is provided by the Card Issuer, or its authorized agent, as the initial point of contact for card holders to report lost or stolen cards, query card product capabilities such as applications supported, request card replacement for damaged, defective, or obsolete cards, and renew expired cards. This interface also provides support for card content and usage analysis. A customer support representative can use card content analysis to view information such as the type of card and the applications installed on the card. This information can be used for problem determination, and to route a customer's call to a specific application support service, if necessary. The usage analysis allows the customer support representative to view the card management transaction history for the card.

2. Request Status Change:

The objects such as cards, cardholders and applications all have a state which reflects their current life-cycle position. For example, a card may be in a personalized, issued, active, or suspended state. The state may or may not be reflected on the card itself, but it is always maintained in the smart card product management system database. Reissuance is necessary to replace damaged, defective, lost or stolen cards, or to upgrade an existing card product in the field. The smart card product management system may provide the same support for reissuance as for the original card issuance.

3. Update Database:

All status changes are stored in the smart card product management system database. These status changes are used to trigger hotlist management processing.

A hotlist represents a set of card products or applications that require state changes at their next attempted usage. The most common usage of states change are to disable or resume usage of a card product or application. Hotlist entries may be removed when the state change is reflected on the card, or when an entry is deleted from the hotlist by the Card Issuer. There are several reasons why an entry would be deleted from a hotlist. For example, a card product that was reported lost would be put on the hotlist to block its usage. If the card product holder finds the card later, the hotlist entry would be deleted by the Card Issuer so that the card product holder can continue to use the card product.

Figure 19:
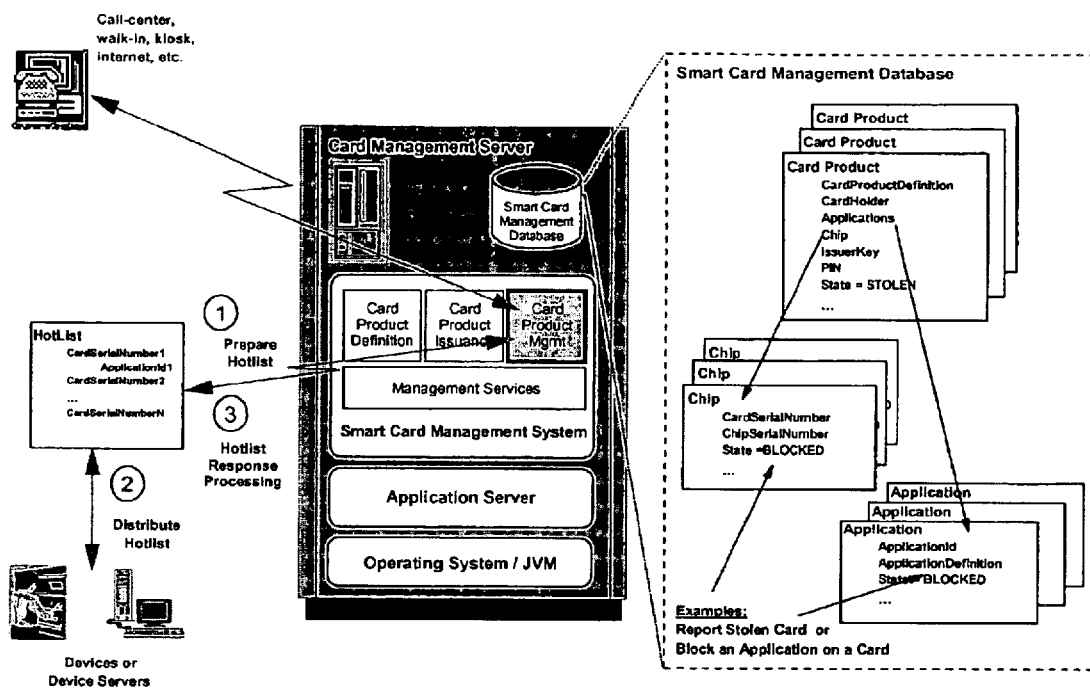
FIG. 19 is a block diagram illustrating hot list processing according to embodiments of the present invention.

Cards may also be put on a hotlist because they have been reported stolen and must be disabled to prevent unauthorized usage. An application may be put on a hotlist for a variety of reasons. For example, it may appear on the hotlist to disable usage by a card product holder until a bill or charge has been settled. After an application has been disabled, it can appear on the hotlist again to resume usage after the bill or charge has been settled. FIG. 19 illustrates embodiments of hot list processing and utilizes the following set of hotlist management functions:

1. Hotlist Preparation:

A set of application programming interfaces is provided to develop applications that prepare hotlists from the data repository based on a set of criteria specified by the Card Issuer. The functions can be used to create a customizable application for hotlist preparation that permits various hotlists to be prepared with variable format and content.

2. Hotlist Distribution:

After they are prepared, hotlists are distributed to the card devices, or servers which are accessible from these devices. The distribution process will have a defined set of data formats and transport protocols. The distribution point will be determined by the process that is used to detect usage of a specific card or application that is on the list.

3. Response Processing:

When a card or application is disabled at the card acceptance interface device, this event is returned to the smart card product management system. This notification will update the card or application's status, and remove the card or application from subsequent hotlists. The actual method used to disable them is card and application dependent. For example, a card with Java Card can be disabled by changing the card life cycle state to BLOCKED.

Card stock may be managed to ensure timely and auditable card issuance and management capabilities for the Card Issuer. Inventory management creates and maintains the necessary data attributes for cards, and supports query and report generation facilities used by the Card Issuer. In addition, interfaces to legacy inventory management systems operated by the Card Issuer can be supported.

Figure 20:
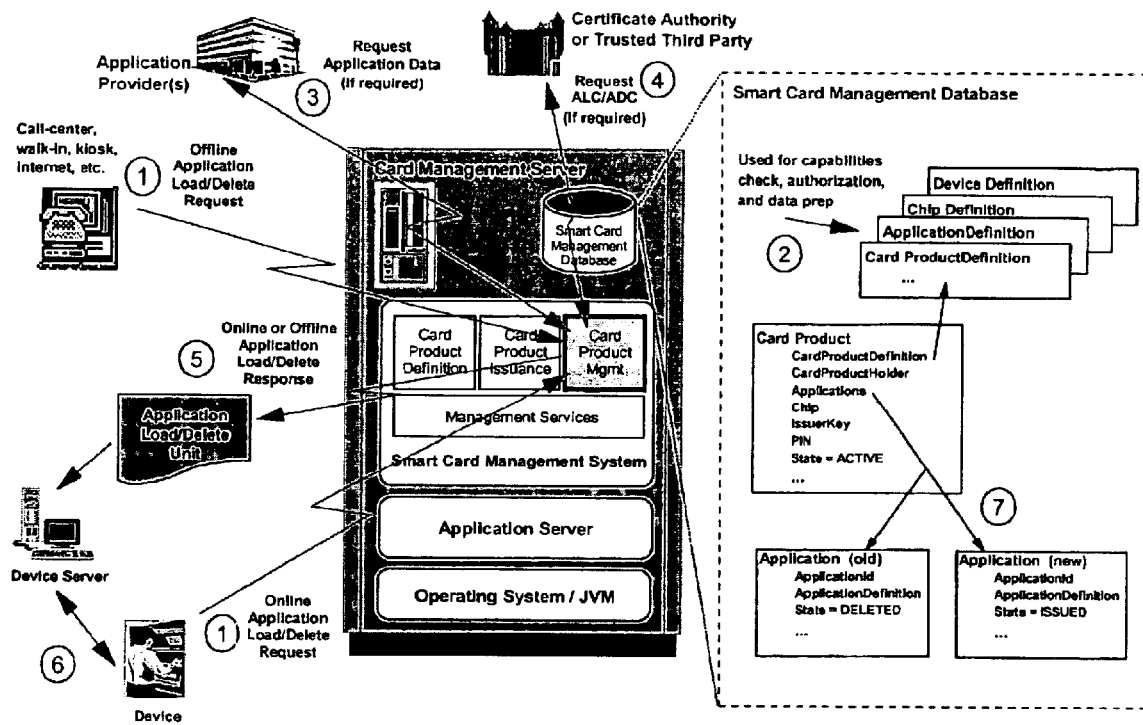
FIG. 20 is a block diagram illustrating operations for post-issuance application management according to embodiments of the present invention.

Post-issuance application management provides the support for adding, deleting and updating applications on a card. FIG. 20 illustrates embodiments of the post-issuance application management process and may carry out the following functions:

1. Application Load or Delete Request:

The smart card product management system may support on-line and/or off-line requests to load or delete an application. This interface allows applications to be loaded onto or deleted from an issued card. This interface accesses the card management database to determine card and application capabilities, and, ultimately, to determine if a specific application may be loaded onto or removed from the card. An on-line request may be driven from devices by card holders. The on-line interface allows a cardholder to interactively add an application to the card, or delete an application from the card. An off-line request can originate from different sources, including the card product holder or a customer support center. The smart card product management system may support the preparation of an order that can be used to add or delete applications at a card acceptance device. Using this order, the device may update a card in a manner transparent to the cardholder during normal card usage. Alternatively, the order may be executed using administrative functions selected by a card product holder at special devices equipped to perform administrative functions.

2. Validation Process:

The post-issuance update request is validated by the smart card product management system. The validation process includes both a card capabilities and a card product holder authorization check. If the update request is valid, then a post-issuance update order is initiated.

3. Request Application Data:

Similar to the initial issuance process, when an update includes an application load request, the application personalization data is obtained from the Application Provider.

4. Request Application Load or Delete Permissions:

Depending upon the type of post-issuance update request, the applicable permission must be obtained in order to load an application onto the card or delete an application from the card.

5. Send Response to Device or Device Server:

The post-issuance update response is sent to either the card accepting device when an on-line request was processed, or it can be sent to a device server when an off-line request was processed.

6. Process Application Update:

The actual application update is processed at a card accepting device. The update can contain an application load or delete request, or it can be a modification to an application that already resides on the card.

7. Update Database:

When the smart card product management system receives an acknowledgment that the post-issuance update has been processed on the card, the life-cycle states for objects in the smart card product management system database are updated. For example, when an application is deleted from a card, the application status is changed to DELETED.

Multi-enterprise support provides the functions that are needed to encode the terms of a business relationship with another enterprise into processing logic within the smart card product management system. Multi-enterprise support may include one or more of the following functions.

Data Synchronization:

This function is needed to maintain a consistent view of the contents of an issued card. Without this function, a reissued card may not contain the same data as the card it was intended to replace. There are two basic types of data synchronization:

Single Location:

The data maintained by the enterprises that participate in the are synchronized, periodically, to a single location. Generally, when this approach is used, the data is maintained in the Card Issuer's database and accessed from there as needed.

Multiple Locations:

The Card Issuer maintains pointers to the data, which is in multiple locations. The data is accessed at the remote locations when needed.

Standard Interfaces and Protocols to External Systems:

All inter-enterprise processing will be based upon a standard set of interfaces and protocols.

Configuration of External Enterprises:

The external enterprises that interact with the smart card product management system may include the Personalization Agency, Application Providers, Registration Authorities, Customer Support Centers and/or Card Terminals and Terminal Servers.

Configuration of Inter-enterprise Communication:

Configuring communication channels between enterprises so that transactions can be sent and received and may include information such as network addresses, protocols, security, authentication (registration of enterprise with Card Issuer), and an authorization level for transactions A smart card product management solution defines the processing boundaries for all of the components within a smart card product management system. The smart card product management system may contain references to the policies and rules that the card issuer has set up to control the smart card product management solution. The policies and rules are the functions that are required for true multi-application card management within a multi-enterprise environment.

Policies may be set by the smart card product management solution owner and are used to control functional processing and interactions within a smart card product management solution. Policies may set the rules that control the interactions between enterprises, and establish the roles and responsibilities of each enterprise, so that transactions can be routed to the correct location. This function is usually controlled by the Card Issuer, and generally involves encoding the business relationships with other enterprises into scheme policies.

A policy manager is used to control all of the smart card product management solution policies. The policies are viewed and updated through the policy manager. The policy manager is consulted prior to processing a function which is policy driven. All of the processing within the smart card product management system adheres to the policies.

An example of a policy is the requirement for data synchronization. It may be important for a smart card product management system to maintain the location of all information required to reissue a card. The policies can be used to determine if this information should be synchronized to one central location periodically, or if it should be requested as needed.

A smart card product management solution may also contain a set of distributed events that can be received by one or more event listeners. The core set of events will be the state changes that occur within definitions and instance objects. For example, an event will be generated when a card product's state changes from ACTIVE to STOLEN, or when an application's state changes to INSTALLED. Event processing is one way to easily extend the base functionality of the system based on the requirements of the Card Issuer or to encode the business relationships between the Card Issuer and its business partners. Hotlist management processing can be implemented using this type of function. The hotlist management process could be an event listener for card product state changes such as ACTIVE to STOLEN, or ACTIVE to LOST. When the state change event is received by the hotlist management process, it can prepare an entry in the hotlist report which will be distributed devices or device servers.

Another example of an event listener could be a billing program run by the Card Issuer. The billing program is responsible for charging an Application Provider each time an application is installed on a card. This type of program could be an event listener that receives events when an application's state changes to INSTALLED.

An event monitor may be used to process distributed events within the smart card product management system. The event monitor is responsible for starting and stopping all event processors, and for routing events to the event processors that are listening for the event.

An event processor can process one or more events, by registering for the events and implementing event listeners. The core set of events will be the state changes that occur within an entity type. An event processor can register and listen for any number of state changes.

Security and auditing services may also provide system access security, transaction logging, error logging, system backup and recovery, and system management hooks. System access security may ensure the security and integrity of a smart card product management system's data and processing logic. In general, security policies may be defined based on session-level authentication and transaction-level authorization requirements.

There may be several types of users that will use client interfaces to access the smart card product management system. Each user may have different levels of authority which will restrict the functions that they can access. All of the users need to be defined and managed by the smart card product management system.

Each user may be authenticated before they can access the system. After they have been authenticated, their authorization level will restrict the data that they can access and the functions that they can process.

Figure 21:
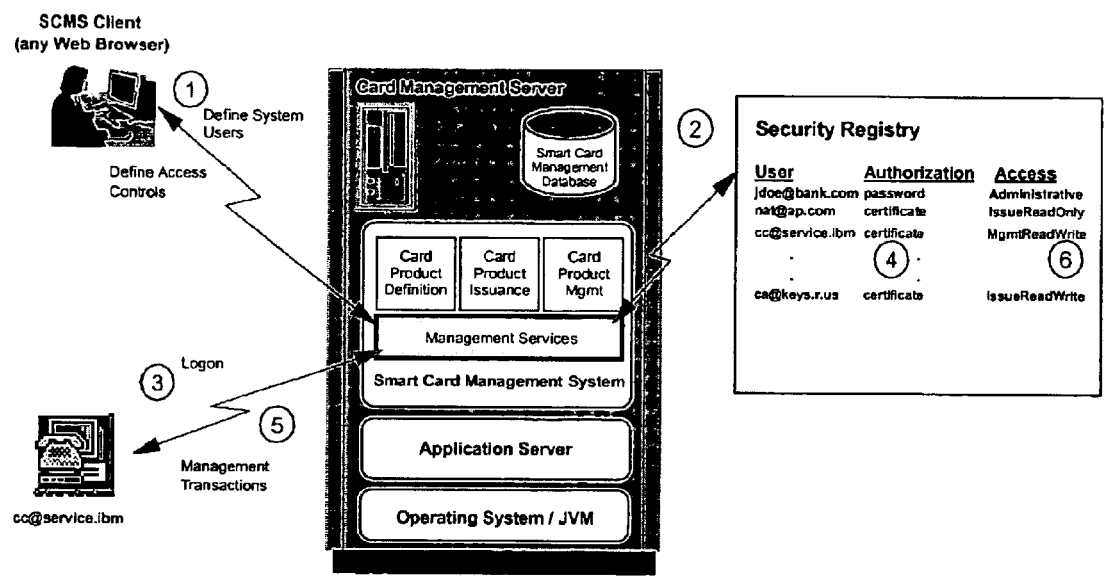
FIG. 21 is a block diagram illustrating operations for security administration according to embodiments of the present invention.

FIG. 21 illustrates embodiments of system security functions that may be available in a smart card product management system and may include the following:

1. Define User and Access Controls:
   The has a user interface that can be used to define the system users and their access controls.
2. Update Security Registry:
   All user definitions and their corresponding access controls are stored in a security registry.
3. User Logon:
   A user can logon from on client that has access to the smart card product management system.
4. Logon Authentication:
   When a user attempts to logon to the system, the user is authenticated based on their definition in the registry.
5. Management Transactions:
   A user can process management transactions from any client that has access to the smart card product management system.
6. Transaction Authorization:
   Before a transaction is processed, the access control for the user is checked to verify that they have the authorization to process the specific type of transaction.

All transactions that are processed by the smart card product management system may be logged. All log entries may contain information such as a date/time stamp, the originator of the transaction or the destination of the transaction, and the type of transaction. The log can be used as an audit trail.

An error log may also be provided. The error log may contain informational, warning and severe error messages. In addition to being logged, severe errors may have to be forwarded to a system administrator for further action.

The smart card product management system may also have an interface to system management programs such as those provided by Tivoli.

Because critical data and applications, especially transactional applications, may reside on and use existing enterprise systems, the smart card product management system may also include legacy systems interfaces. The legacy system interfaces provide a connection from the smart card product management system to these existing enterprise systems. The application connections allow disparate applications to communicate with each other.

The components of a smart card product management system can be operated by different enterprises on different systems. For example, the smart card product management system may provide the capability to manage the communication between the enterprises and delegate management responsibilities to an enterprise based on the policies defined by the Card Issuer.

When communicating directly between components of the system, the CORBA Internet InterOrb Protocol (IIOP) may be used. This method can also be used by other systems which need to communicate with components within the smart card product management system. These other systems can be written in any language that uses CORBA/IIOP, as long as its components are deployed in a manner that makes them accessible through CORBA interfaces.

When components of the smart card product management system must communicate with other systems that do not support CORBA interfaces, messages may be used as the means of communication. Generally, messages are requests that are processed by a server in the context of a transaction. A transaction is a unit of work (or a collection of operations) that interacts with one or more shared databases.

Within a smart card product management solution, the enterprise interfaces may indicate the transaction data that needs to flow between enterprises and may also specify how the data is transferred between enterprises. Enterprise interfaces may include an Application Provider interface, a Card Bureau interface, a Certificate Authority interface, a Registration Authority interface, a Trusted Third Party interface, a Customer Support interface and a Card and Card Terminal interface. For each interface that requires a transaction between enterprises, both the transaction request and the transaction response may be defined in a standard message format using XML. Examples of these interfaces are briefly described below.

Application Provider Interface (API)

The API ensures that the interface adheres to overall policies established by the Card Issuer. The API also provides a method to synchronize application data between enterprises as dictated by the scheme policies. The API may also provide for sending card hotlist notification to the Application Provider. The API may be used to process application suspend requests from the Application Provider and send notification that the application has been suspended. The API may also receive the information that is required to register an application with the MULTOS CA so that it can be put onto a card owned by the Card Issuer. The API may also provide for receiving the application code, static data and key needed to create the Application Load Unit (ALU) or Load Commands. Additionally, the API may provide for processing add, update, and delete application requests based on requests received from the Application Provider.

Card Bureau Interface (CBI)

The CBI may be utilized to send the information that is required for card personal ization. The CBI may also provide for sending information that is required to mail card letters. The CBI may also be utilized to optimize card requests based on Card Domain (Product ID) or Control Data Date. The CBI may exchange information that can be used for card inventory tracking. The CBI may further be used to request M-ULTOS Carrier Device (MCD) Ids needed to request certificates and send MULTOS Security Manager(MSM) Controls Data.

Certificate Authority Interface (CAI)

The CAI may provide for requesting generation of certificates for both cards and applications and may also be used to reissue a certificate for a card or application. The CAI may securely transmit certificates between enterprises and exchange information that is required to revoke a certificate. The CAI may provide for registering to become a MUTOS Card issuer. The CAI may also be used to register applications so that they can be loaded onto a card and request Application Load Certificates (ALC) and Application Delete Certificates (ADC).

Registration Authority Interface (RAI)

The RAI may provide for registering a card product holder for a specific type of card and registering a card product holder to add applications to a card. The RAI may also handle the requirement for anonymous card holders.

Trusted Third Party Interface (TTPI)

The TTPI may provide for requesting key generation for both cards and applications and securely transmitting keys from one enterprise to another.

Customer Support Center Interface (CSCI)

The CSCI may be utilized to report lost, stolen, damaged or defective cards, update card product holder related information and request a card replacement.

Card and Card Terminal Interface (CCTI)

The CCTI may be used to securely transmit the application load or delete request. The CCTI may also be used to activate a card or block a cards usage, suspend a single application (which is not the same as deleting the application) and track card utilization.

The database interfaces may be used to add, update, delete, and query data that is in the database. Databases may be used by the card management servers for different purposes, so functional capabilities may vary according to specific customer requirements. For card product and application management, a relational database may be used to manage the complex relationships between data objects. The basic database interface provides the function required to support relational databases, such as DB2, Oracle, Informix, and Sybase. The database interfaces may also provide interfaces to existing customer databases.

The smart card product management system may also provide for transactional database control. A transaction is a unit of work (or a collection of operations) that interacts with one or more shared databases. Embodiments of the smart card product management system according to the present invention may provide transactions with the following characteristics:

Atomicity: A transaction will either execute completely or all of its effects will be undone (rolled back).

Consistency: A transaction must produce consistent results, by maintaining the internal consistency of each database.

Isolation: A transaction's intermediate states are not visible to other transactions. Transactions appear to execute serially, even if they run concurrently.

Durability: The effects of a completed transaction are persistent. An example of a transaction is transferring money from a checking account to a savings account. The unit of work consists of two operations:

1. Subtracting the money from the checking account.
2. Adding the same amount of money to the savings account.

Both operations must be completed or both operations must be undone in order to achieve a consistent result. If both operations are completed, the results of the transaction are persistent.

Figure 22:
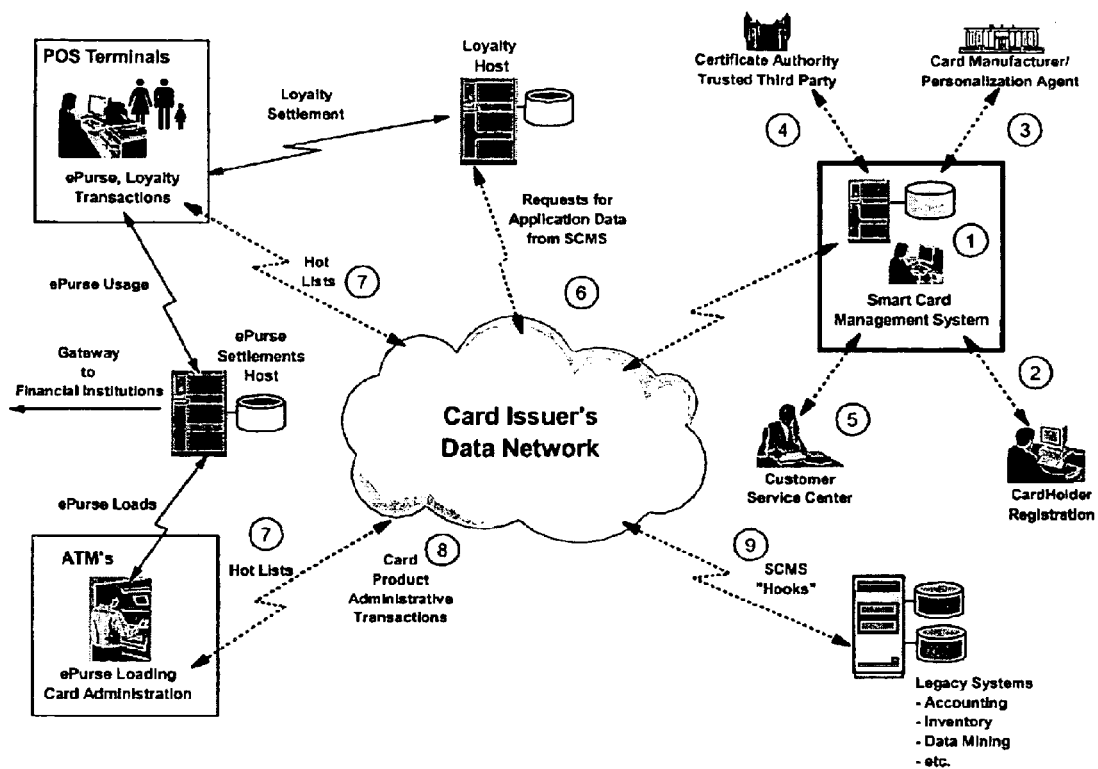
FIG. 22 is a block diagram of an example smart card product management system according to embodiments of the present invention.

FIG. 22 illustrates embodiments of a complete smart card product management solution. The smart card product management system contains the core set of card management components. These components are extended based on the requirements of the Card Issuer's scheme. In this example, the extensions are represented as dashed lines. All of the customer unique components are represented by solid lines. The card management component extensions include the following types of functions:

1. Card Product Administration:

An administrative interface is provided by the Customization of the "look and feel" of this user interface may be required to integrate the administrative functions for the into a larger customer solution. Source code for the customization of this interface may be provided with the system to permit visual customization of this interface.

2. Card Product Holder Registration Interface:

Card product holder registration for a card product may be performed in a variety of ways, each requiring a unique and different interface for gathering data and interacting with the smart card product management system. Examples of these interfaces include:

Registration Authority such as a corporate security officer. Mailed applications received from prospective card holders, entered into the through an administrative interface. Electronic applications, entered as transactions at an administrative kiosk, or an Internet web page. Existing customers, selected from a legacy database.

In each case, the smart card product management system supports a well-defined set of transactions which are defined in a XML data.

3. Card Manufacturer/Personalization Agency Interface:

All interactions between the smart card product management system and a Card Manufacturer or Personalization Agency require the exchange of data such as keys, certificates, application data, and card product holder data. Typically, these data items require a highly secure transport mechanism, using authentication and encryption techniques to ensure data privacy. In many cases, these enterprises accept files containing the data in a proscribed format, and delivered on tape or disk by a secure courier service. Secure electronic transmissions may also be used. Customization of these interfaces will require both the preparation and interpretation of the various data formats and storage media involved. The smart card product management system can be utilized to acquire data, to prepare the data in a required format, and for input and processing of responses from these enterprises. Extensions and customization may be necessary to support unique interfaces. User definitions and their corresponding access controls are stored in a user registry.

4. Key and Certificate Management:

Trusted Third Parties and Certificate Authorities which generate and securely store keys and certificates, have existing interfaces which differ from enterprise to enterprise. The smart card product management system interacts with these enterprises and may require customization to support their transactions.

5. Customer Support Interfaces:

Customer support can be implemented in a variety of ways, each requiring a unique and different interface for accessing card product holder and card product information from the smart card product management system, and for updating card product status. Examples of these interfaces include:

Customer Support Centers which provide staffed or automated interfaces.

Walk-in centers, which in some cases may have the capability of replacing a card product.

Electronic support, entered as transactions at an administrative kiosk, or an Internet web page.

In each case, a well-defined set of transactions and transaction data formats will be supported by the.

6. Application Data Management:

The smart card product management system will define a set of transactions and data formats for the acquisition and exchange of application specific data. The exchange of application data is part of the data synchronization support. Keys, PINs, certificates, and business data must be acquired and processed by the in support of the personalization process during both initial card product issuance, replacement of a card product, or post-issuance load of an application onto a card product.

7. Hotlist Processing:

The smart card product management system will provide well-defined transactions and transaction data formats for the selection, retrieval and post-processing of card products and applications that are hotlisted. However, both custom message formats and custom distribution mechanisms that require new or unique interface extensions, may be utilized within a complete customer solution.

8. Card Product Administration Transactions:

A limited set of card product administration transactions can be initiated from a subset of card acceptance devices, such as ATMs and kiosks. Other devices such as POS terminals are generally not appropriate for card product administrative tasks.

9. Legacy System Interface:

To provide a complete customer solution, custom interfaces between the and corporate legacy systems such as billing, inventory, and data mining may be required. Extensions may be added to the which gain control at the occurrence of selected management events. These extensions can be used to implement a required custom interface.

Figure 23:
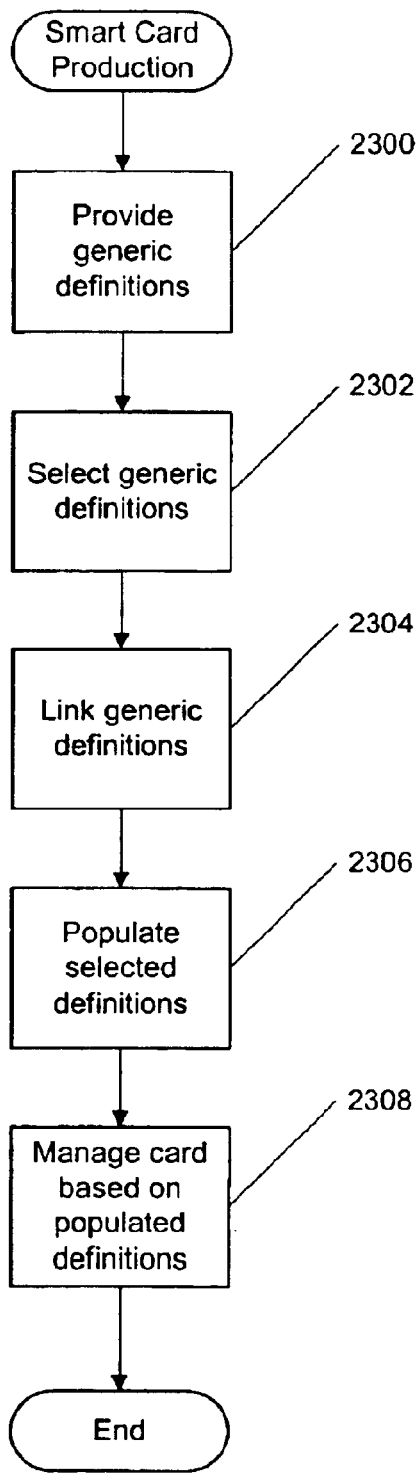
FIG. 23 is a flow chart illustrating operations for creating a smart card product according to embodiments of the present invention.

As a further example of embodiments of the present invention, FIGS. 23 through 28 are flowchart illustrations of operations carried out by a smart card product management system according to embodiments of the present invention. As seen in FIG. 23, a smart card product may be produced by providing generic definitions which may have predefined relationship to other generic definitions so as to provide a hierarchy of generic definitions (block 2300). Such definition may be as illustrated in FIG. 9 and may describe various characteristics of smart card products and/or processes which may be used to manage smart card products. Particular definitions from these generic definitions are selected and associated with a card product definition so as to define characteristics of particular smart card product associated with an instance of the card product definition (block 2302). The selected generic definitions may also be linked to other selected definitions to further define the hierarchy of generic definitions associated with the instance of the smart card product definition (block 2304). The selected generic definitions may be populated with data associate with the smart card product so as to provide instances of the generic definitions which define the characteristics of the smart card product (block 2306). The smart card product may then be managed utilizing the hierarchy of instances of the generic definitions so as to provide the smart card product having the defined characteristics (block 2308). Management of the smart card product may include the various processes and operations for any period up to and including throughout the life of the smart card product. Examples of such management include those aspects of the smart card product management system described above with referent to FIGS. 1 through 22 as well as those described below with reference to FIGS. 24 through 28.

Illustrated in FIGS. 24 through 28 are operations carried out by smart card product management systems according to embodiments of the present invention to initiate the manufacture and enablement of cards and to perform post-processing after the process completes. These exemplary processes include card enablement, card holder registration, card personalization and issuance, hot list management, and post-issuance application loads. Each of these processes will be described below. For each step, references to Smart Card component definitions are shown in bold.

Card Enablement

Figure 24:
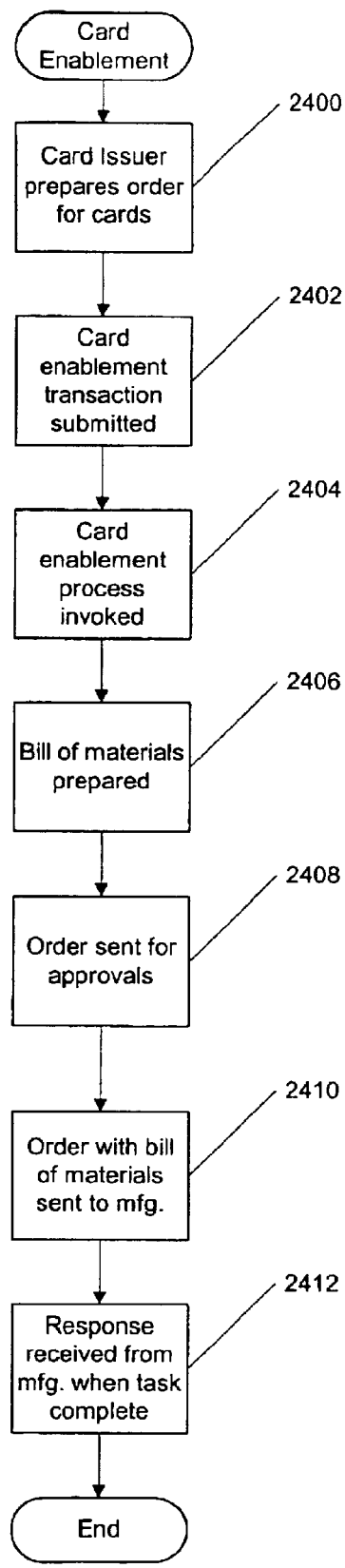
FIG. 24 is a flow chart illustrating operations for card enablement according to embodiments of the present invention.

As seen in FIG. 24, operations for card enablement begin by the card issuer preparing an order for some number of cards to be enabled (block 2400). A list of CardProduct definition IDs may be used to assist in interactive order preparation. Chip definitions (if more than one) associated with a CardProduct definition may be presented as well.

The card enablement transaction is submitted to the management system (block 2402) and the smart card product management system invokes a Card Enablement Process (block 2404). The CardProduct definition is used to locate the Process definition with Type "Enablement". Task definitions associated with the Process definition are interrogated and an initial task's Connection definition is used to locate and initiate the initial task execution.

A task associated with the enablement process definition prepares a bill of materials for the order (block 2406). Such a bill of materials may be created by a task or tasks which traverse the CardProduct definition to find Application and Key definitions which may be required to acquire application code to be initialized in EEPROM and to locate issuer's security controls. The order may then be sent for approval(s) (block 2408). A task definition may be used to find and initiate an executable interface to approval personnel. The CardProduct definition may be used by approval personnel to interrogate the data repository(ies) for inventory numbers and to verify order preparation details. When approved, the order with bill of materials is sent to a Card Manufacturer (block 2410). The CardProduct definition may be used to find an Enterprise definition for the Card Manufacturer and its associated Connection definition to initiate the transaction. When the task is complete, a response is received from the Card Manufacturer (block 2412). A task definition may also be used to initiate post-processing. CardProduct, Application and Chip definitions may be used to create records to represent actual cards and their enabled contents.

Card Holder Registration

Figure 25:
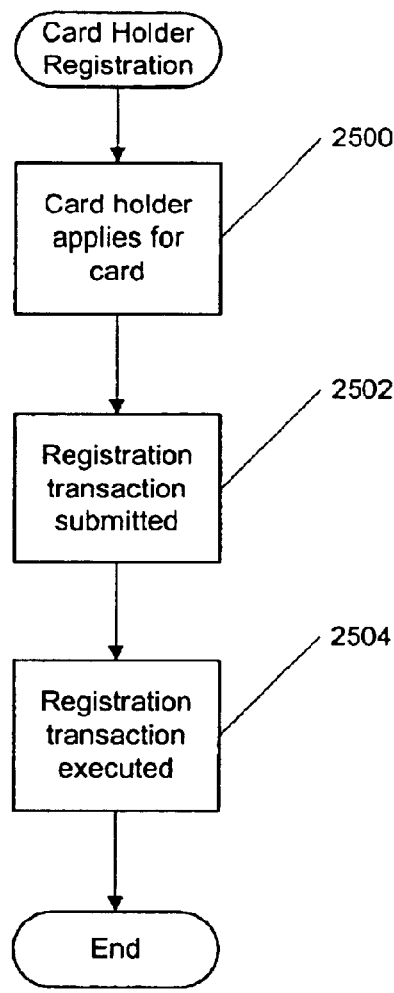
FIG. 25 is a flow chart illustrating operations for card holder registration according to embodiments of the present invention.

As seen in FIG. 25, the registration process may begin by a user applying for a card via a Registration Authority, on-line registration or other such methods (block 2500). The CardProductHolder definition may be used by the RA to validate applicant data. The CardProduct definition may also be used to find Application definitions which specify whether an application is optional and may be selected. The ApplicationHolder definition determines what unique application data (e.g. Employee serial, account number, etc.) needs to be obtained from applicant. When the data is gathered, a Card Holder registration transaction is submitted (block 2502). The smart card product management system executes the Card Holder registration transaction (block 2504). The CardProductHolder definition is used to create a new card product holder record. The ApplicationHolder definition is used to create a new application holder record for each application selected by applicant.

Card Personalization and Issuance

Figure 26:
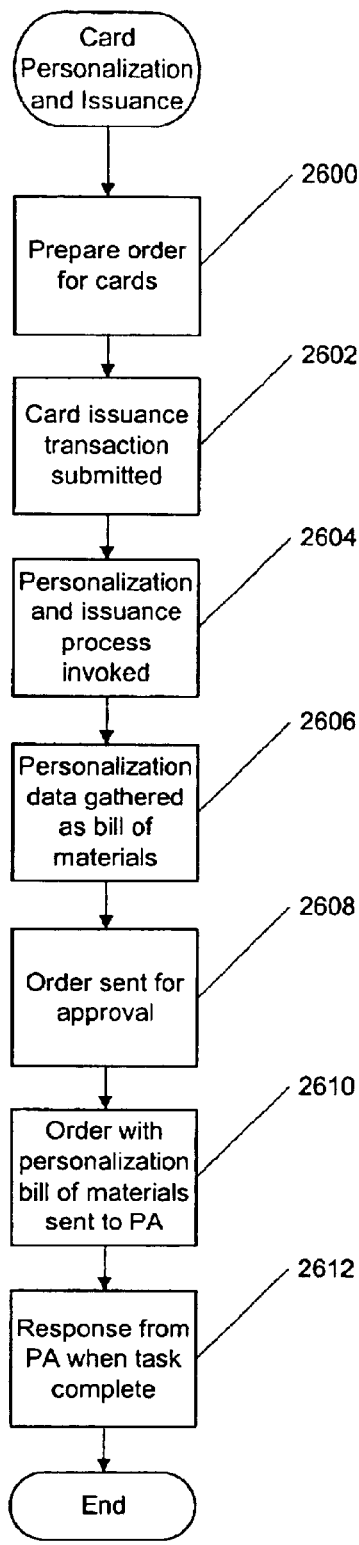
FIG. 26 is a flow chart illustrating operations for card personalization and issuance according to embodiments of the present invention.

As seen in FIG. 26, a Card Issuer prepares an order for some number of cards to be issued (block 2600). This order may be for all registered card holders waiting for an issue of the specific card product or for particular card holders. A list of CardProduct definition IDs may be used to assist in interactive order preparation, or to select all registered card holders waiting for a card to be issued. The card issuance transaction is submitted to the smart card product management system (block 2602). In response, the management system invokes the card personalization and issuance process (block 2604). The CardProduct definition is used to locate a process definition with Type "Personalization". Task definitions associated with the Process definition are interrogated and an initial task's Connection definition is used to locate and initiate execution of the initial task.

Personalization data is gathered as the bill of materials for the personalization aspects of issuance (block 2606). Using the CardProduct definition, the CardProductHolder, Application and ApplicationHolder definitions are accessed to begin acquiring personalization data for the card. An Enterprise definition and its associated Connection definition are used to interact with each application provider to acquire the personalization data for the application which they support. Key and Certificate definitions associated with each application are used to determine security data for personalizing the card.

When complete, the order is sent for approval(s) (block 2608). A Task definition may be used to find and initiate an executable interface for approval personnel. The CardProduct definition may be used by the approval personnel to interrogate the data repository(ies) for inventory numbers and to verify order preparation details.

When approved, the order with a personalization bill of materials, is sent to the Card Issuer's Personalization Agency (block 2610). The CardProduct definition is used to find the Enterprise definition for PA and its associated Connection definition to initiate the transaction. When the task is complete, a response is received from the PA (block 2612). The Task definition may be used to initiate post-processing. The CardProductHolder and Application records are associated with an enabled CardProduct record. Key and Certificate records are created and associated with Applications records as required.

Hot List

An additional smart card product management function which may be provided by a management system is the capability to report that a card has been lost or stolen, and to prevent subsequent unauthorized use of that card. Typically, a management system will produce a list of cards which is then distributed and made available to the card terminals for real-time detection.

Figure 27:
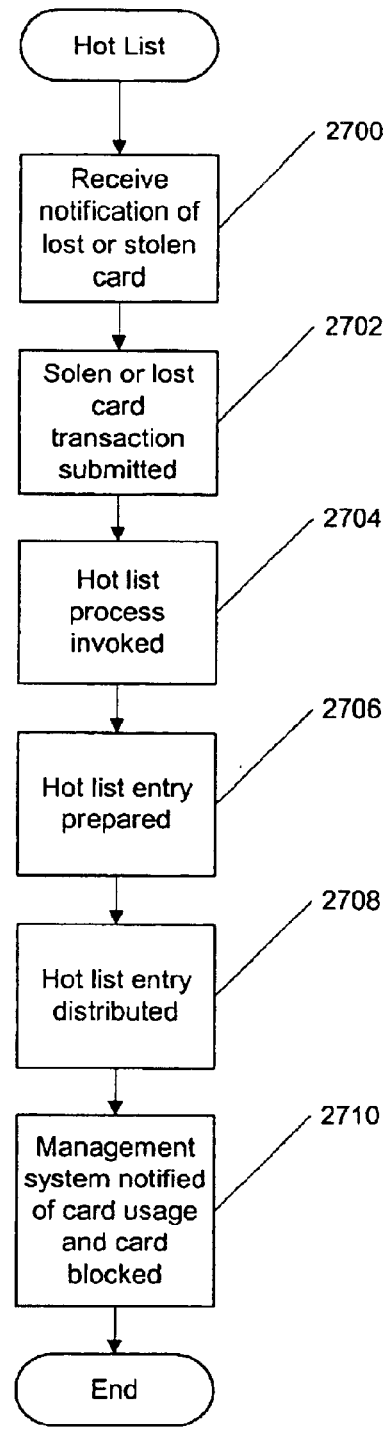
FIG. 27 is a flow chart illustrating operations for hot list management according to embodiments of the present invention.

As illustrated in FIG. 27, the hot list operations may be initiated by receiving notification that a card has been lost or stolen (block 2700) from, for example, a Call Center or other form of customer support service. Using some form of customer or card identification and card product type, the CardProduct and CardProductHolder definitions are used to find the card holder and card product record and to validate the report. If valid, a stolen card or lost card transaction is submitted to the system (block 2702). The stolen or lost card transaction results in the Hot List process being initiated (block 2704). The CardProduct definition may be used to find the Process definition with type "HotList". Task definitions associated with the Process definition are interrogated and an initial task's Connection definition is used to locate and initiate task execution.

A Hot List entry is prepared (block 2706). The CardProduct record is marked "Stolen" or "Lost". The serial number of the card and any other data required is prepared for distribution. The Hot List entry is then distributed (block 2708). The Task definition and Connection definition are used to determine how to execute the distribution of the Hot List entry. Device definition(s) might be used to determine a distribution destination(s). If the card is utilized again, the management system may be notified of this subsequent usage (block 2710). The CardProduct definition may be used again to locate the subject card product record, which is then updated to reflect that the card has been "blocked" or possibly suspended.

Post-issuance Application Load

Figure 28:
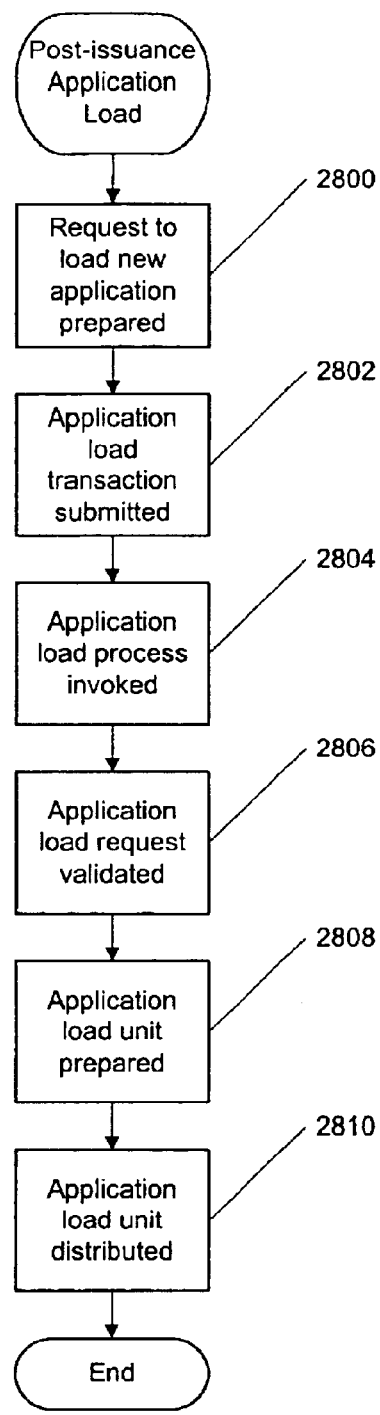
FIG. 28 is a flow chart illustrating operations for post-issuance application loading according to embodiments of the present invention.

Multi-application smart cards may offer the capability to dynamically load (or delete) applications after the card has been issued to a card holder. Typically, the card holder will initiate a request to add a new application using an interface or procedure provided by the card issuer or by an application provider. FIG. 28 illustrates operations which may be carried out by the smart card product management system to accomplish the post-issuance load of an application in response to a card holder request.

As seen in FIG. 28, a card holder prepares a request to load a new application on the card product (block 2800). The CardProduct definition and associated Application definitions could be used by the interface to present appropriate selections to the card holder for the card product to be updated. An application load transaction is then submitted to the smart card product management system (block 2802). The application load transaction results in the Application load process being invoked by the smart card product management system (block 2804). The CardProduct definition may be used to find the Process definition with type "ApplicationLoad". The Task definitions associated with the Process definition are interrogated and an initial task's Connection definition is used to locate and initiate task execution. The application load request is also validated (block 2806). The CardProduct, Application, Chip and Platform definitions are used to validate the request, determining if the requested application is valid for the card, whether there is enough memory (EEPROM) on the card, whether this card holder is authorized for the application, etc.

If valid, the application load is prepared (block 2808). The Application and ApplicationHolder definitions may be used to prepare the application code to be installed and to access any personalization data for the application for this holder. The Application definition may have associated Enterprise and Connection definitions which determine how to request personalization data from the application provider. Key and Certificate definitions may be interrogated to determine the security requirements for the applications and to acquire these items if necessary. Finally, the application load unit may then be distributed for installation (block 2810). The Task definition and its Connection definition may be used to determine how to execute the distribution of the new application load unit to the card terminal which can perform the installation.

The operations for smart card product management illustrated in FIGS. 5 through 28 may provide core functions which provide for creation and control of smart card products. Thus, as will be appreciated by those of skill in the art in light of the present disclosure, these core functions may be further manipulated to provide additional smart card product management functions. Accordingly, the present invention should not be construed as limited to the particular definitions and processes described herein but the definitions and processes are provided as examples of the uses of embodiments of the present invention.

The flowcharts and block diagrams of FIGS. 1 through 23 illustrate the architecture, functionality, and operation of possible implementations of systems, methods and computer program products for smart card product management. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of managing a smart card product, comprising the steps of:
   providing a plurality of generic definitions in a database at least a portion of which have a predefined relationship to others of the generic definitions so as to provide a hierarchy of generic definitions;
   selecting generic definitions from the plurality of generic definitions to associate the selected generic definitions with an instance of a card product definition, the instance of the card product definition defining characteristics of the smart card product; and
   populating the selected generic definitions with data associated with the smart card product so a, to provide a hierarchy of instances of the generic definitions which define the characteristics of the smart card product;
   wherein one or more data processing systems is configured to utilize the hierarchy of instances of the generic definitions to manage the smart card product;
   wherein the steps of providing a plurality of generic definition objects, selecting generic definition objects and linking the selected generic definitions comprise the steps of:
   establishing the instance of the card product definition;
   associating at least one chip definition with the instance of the card product definition;
   associating at least one process definition with the instance of the card product definition; associating at least one task definition with the at least one process definition;
   associating at least one enterprise definition with the instance of the card product definition; and
   associating at least one application definition with the instance of the card product definition.

2. A method according to claim 1, further comprising the step of managing at least one of registration of card product holders, smart card product enablement, smart card product personalization, smart card product application data, smart card product hot lists and smart card product post-issuance application updates utilizing the hierarchy of instances of the generic definitions so as to provide the smart card product having the defined characteristics.

3. A method according to claim 2, further comprising the step of selectively linking at least two of the selected generic definitions to further define the hierarchy of instances of the generic definitions associated with the smart card product so as to further define the characteristics of the smart card product.

4. A method according to claim 2, wherein the plurality of generic definitions include process definitions which define smart card management tasks which are configured to manage the attributes of the smart card product.

5. A method according to claim 2, wherein the plurality of generic definitions include a platform definition, a card product holder definition, a device definition, a certificate definition, or a key definition.

6. A method according to claim 1, wherein the step of associating at least one process definition with the instance of the card product definition comprises the step of associating an enablement process definition, a registration process definition and a personalization process definition with the card product definition.

7. A method according to claim 6, further comprising the step of associating at least one task definition with the enablement process definition so as to carry out the enablement process.

8. A method according to claim 6, further comprising the step of associating at least one task definition with the registration process definition so as to carry out the registration process.

9. A method according to claim 6, further comprising the step or associating at least one task definition with the personalization process definition so as to carry out the personalization process.

10. A method according to claim 1, wherein the step of associating at least one process definition with the instance of the card product definition comprises the step of associating a hot list definition with the instance of the card product definition.

11. A method according to claim 10, further comprising the step of associating at least one task definition with the hot list process definition so as to carry out the hot list process.

12. A method according to claim 1, wherein the step of associating at least one process definition with the instance of the card product definition comprises the step of associating an application load definition with the instance of the card product definition.

13. A method according to claim 12, further comprising the step of associating at least one task definition with the application load process definition so as to carry out the application process.

14. A method according to claim 1, further comprising the steps of:
   associating an enterprise definition with the at least one process definition if the at least one process definition utilizes resources of an enterprise outside the domain of a smart card management server; and
   associating a connection definition with the at least one process so as to define a mechanism for establishing a connection between the smart card management server and an enterprise associated with the enterprise definition associated with the at least one process definition.

15. A system for managing smart card products, comprising:
   a database of smart card definitions, wherein the smart card definitions are associated in a hierarchical manner so as to encapsulate characteristics of smart card components, interrelationships with other components, and work processes; and
   a smart card server operably associated with the database and configured so as to manage smart card products based on instances of the smart card definitions associated with the smart card products so as to define the characteristics of the smart card products and tasks associated with managing the smart card products; the smart card definitions associated with the smart card products including at least one chip definition, at least one process definition, at least one task definition, at least one application definition, at least one enterprise definition and at least one connection definition; and
   wherein the smart card server is further configured to utilize an instance of an enterprise definition and an instance of a connection definition to establish communications with an enterprise associated with the enterprise definition so as to allow the enterprise associated with the enterprise definition to carry out a task associated with managing the smart card products.

16. A system according to claim 15, further comprising an application manager server, wherein the application manager server is configured to manage applications loaded on a smart card product based on smart card definitions associated with the smart card product.

17. A system according to claim 15, further comprising a certificate server configured to manage certificates utilized with a smart card product based on smart card definitions associated with the smart card product.

18. A system for managing a smart card product, comprising:
  means for providing a plurality of generic definitions in a database, at least a portion of which have a predefined relationship to others of the generic definitions so as to provide a hierarchy of generic definitions;
  means for selecting generic definitions from the plurality of generic definitions to associate the selected definitions with an instance of a card product definition, the instance of the card product definition defining characteristics of the smart card product; and
  means for populating the selected generic definitions with data associated with the smart card product so as to provide a hierarchy of instances of the generic definitions which define the characteristics of the smart card product;
  means for utilizing the hierarchy of instances of the generic definitions to manage the smart card product:
  wherein the means for providing a plurality of generic definition objects, means for selecting generic definition objects and means for linking the selected generic definitions comprise:
  means for establishing the instance of a card product definition;
  means for associating at least one chip definition with the instance of the card product definition;
  means for associating at least one process definition with the instance of the card product definition;
  means for associating at least one task definition with the at least one process definition;
  means for associating at least one enterprise definition with the instance of the card product definition; and
  means for associating at least one application definition with the instance of the card product definition.

19. A system according to claim 18, further comprising means for managing at least one of registration of card product holders, smart card product enablement, smart card product personalization, smart card product application data, smart card product hot lists and smart card product post-issuance application updates utilizing the hierarchy of instances of the generic definitions so as to provide the smart card product having the defined characteristics.

20. A system according to claim 19, further comprising means for selectively linking at least two of the selected generic definitions to further define the hierarchy of instances of the generic definitions associated with the smart card product so as to further define the characteristics of the smart card product.

21. A system according to claim 19, wherein the plurality of generic definitions include process definitions which define smart card management tasks which are configured to manage the attributes of the smart card product.

22. A system according to claim 19, wherein the plurality of generic definitions include a platform definition, a card product holder definition, a device definition, a certificate definition or a key definition.

23. A system according to claim 18, wherein the means for associating at least one process definition with the instance of the card product definition comprises means for associating an enablement process definition, a registration process definition and a personalization process definition with the card product definition.

24. A system according to claim 23, further comprising means for associating at least one task definition with the enablement process definition so as to carry out the enablement process.

25. A system according to claim 23, further comprising means for associating at least one task definition with the registration process definition so as to carry out the registration process.

26. A system according to claim 23, further comprising means for associating at least one task definition with the personalization process definition so as to carry out the personalization process.

27. A system according to claim 18, wherein the means for associating at least one process definition with the instance of the card product definition comprises means for associating a hot list definition with the instance of the card product definition.

28. A system according to claim 27, further comprising means for associating at least one task definition with the hot list process definition so as to carry out the hot list process.

29. A system according to claim 18, wherein the means for associating at least one process definition with the instance of the card product definition comprises means for associating an application load definition with the instance of the card product definition.

30. A system according to claim 29, further comprising means for associating at least one task definition with the application load process definition so as to carry out the application process.

31. A system according to claim 18, further comprising:
  means for associating an enterprise definition with the at least one process definition if the at least one process definition utilizes resources of an enterprise outside the domain or a smart card management server, and
  means for associating a connection definition with the at least one process so as to define a mechanism for establishing a connection between the smart card management server and an enterprise associated with the enterprise definition associated with the at least one process definition.

32. A computer program product for managing a smart card product, comprising:
  a computer readable media having computer readable program code embodied therein, the computer readable program code comprising:
  computer readable program code which provides a plurality of generic definitions in a database, at least a portion of which have a predefined relationship to others of the genetic definitions so as to provide a hierarchy of generic definitions;
  computer readable program code which selects generic definitions from the plurality of generic definitions to associate the selected generic definitions with an instance or a card product definition, the instance of the card product definition defining characteristics of the smart card product; and computer readable program code which populates the selected generic definitions with data associated with the smart card product so as to provide a hierarchy of instances of the generic definitions which define the characteristics of the smart card product;

computer readable program code which utilizes the hierarchy of instances of the generic definitions to manage the smart card product;

wherein the computer readable program code which provides a plurality of generic definition objects, computer readable program code which selects generic definition objects and computer readable program code which selectively links the selected generic definitions comprise:

computer readable program code which establishes the instance of a card product definition;

computer readable program code which associates at least one chip definition with the instance of the card product definition;

compute readable program code which associates at least one process definition with the instance of the card product definition;

computer readable program code which associates at least one task definition with the at least one process definition;

computer readable program code which associates at least one enterprise definition with the instance of the card product definition; and computer readable program code which associates at least one application definition with the instance of the card product definition.

33. A computer program product according to claim 32, further comprising computer readable program code which manages at least one of registration or card product holders, smart card product enablement, smart card product personalization, smart card product application data, smart card product hot lists and smart card product post-issuance application updates utilizing the hierarchy of instances of the generic definitions so as to provide the smart card product having the defined characteristics.

34. A computer program product according to claim 33, further comprising computer readable program code which selectively links at least two of the selected generic definitions to further define the hierarchy of instances of the generic definitions associated with the smart card product so as to further define the characteristics of the smart card product.

35. A computer program product according to claim 33, wherein the plurality of generic definitions include process definitions which define smart card management tasks which are configured to manage the attributes of the smart card product.

36. A computer program product according to claim 33, wherein the plurality of generic definitions include a platform definition, a card product holder definition, a device definition, a certificate definition or a key definition.

37. A computer program product according to claim 32, wherein the computer readable program code which associates at least one process definition with the instance or the card product definition comprises computer readable program code which associates an enablement process definition, a registration process definition and a personalization process definition with the card product definition.

38. A computer program product according to claim 37, further comprising computer readable program code which associates at least one task definition with the enablement process definition so as to carry out the enablement process.

39. A computer program product according to claim 37, further comprising computer readable program code which associates at least one task definition with the registration process definition so as to carry out the registration process.

40. A computer program product according to claim 37, further comprising computer readable program code which associates at least one task definition with the personalization process definition so as to carry out the personalization process.

41. A computer program product according to claim 32, wherein the computer readable program code which associates at least one process definition with the instance of the card product definition comprises computer readable program code which associates a hot list definition with the instance of the card product definition.

42. A computer program product according to claim 41, further comprising computer readable program code which associates at least one task definition with the hot list process definition so as to carry out the hot list process.

43. A computer program product according to claim 32, wherein the computer readable program code which associates at least one process definition with the instance of the card product definition comprises computer readable program code which associates an application load definition with the instance or the card product definition.

44. A computer program product according to claim 43, further comprising computer readable program code which associates at least one task definition with the application load process definition so as to carry out the application process.

45. A computer program product according to claim 32, further comprising:

computer readable program code which associates an enterprise definition with the at least one process definition if the at least one process definition utilizes resources of an enterprise outside the domain of a smart card management server; and computer readable program code which associates a connection definition with the at lest one process so as to dine a mechanism for establishing a connection between the smart card management server and an enterprise associated with the enterprise definition associated with the at least one process definition.

* * * * *

UNITED STATES PATENT AND TRADEMARK OFFICE
CERTIFICATE OF CORRECTION

PATENT NO. : 6,880,084 B1
DATED : April 12, 2005
INVENTOR(S) : Brittenham et al.

It is certified that error appears in the above-identified patent and that said Letters Patent is hereby corrected as shown below:

Column 43,
Line 24, should read -- ciated with the smart card product so as to provide a --.

Column 44,
Line 16, should read -- step of associating at least one task definition with the --.

Column 45,
Line 62, should read -- card product so as to further define the characteristics of the --.

Column 48,
Line 3, should read -- ciates at least one process definition with the instance of the --.
Line 37, should read -- with the instance of the card product definition. --.
Line 53, should read -- define a mechanism for establishing a connection --.

Signed and Sealed this

Sixteenth Day of May, 2006

JON W. DUDAS
*Director of the United States Patent and Trademark Office*